(12) United States Patent
Mimura et al.

(10) Patent No.: US 9,278,454 B2
(45) Date of Patent: Mar. 8, 2016

(54) PRODUCTION APPARATUS

(71) Applicant: CANON KABUSHIKI KAISHA, Tokyo (JP)

(72) Inventors: Toshihiko Mimura, Tokyo (JP); Keita Dan, Tokyo (JP); Tadashi Eguchi, Tokyo (JP); Tomoyuki Takada, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 61 days.

(21) Appl. No.: 14/316,664

(22) Filed: Jun. 26, 2014

(65) Prior Publication Data

US 2015/0012137 A1    Jan. 8, 2015

(30) Foreign Application Priority Data

Jul. 4, 2013    (JP) .................................. 2013-140328

(51) Int. Cl.
*B25J 13/00*    (2006.01)
*H01Q 3/02*    (2006.01)
*B25J 13/08*    (2006.01)

(52) U.S. Cl.
CPC .............. *B25J 13/006* (2013.01); *B25J 13/088* (2013.01); *H01Q 3/02* (2013.01); *Y10S 901/02* (2013.01)

(58) Field of Classification Search
CPC ...... B25J 13/006; B25J 9/1697; B25J 19/021; B25J 19/023; H01Q 3/02–3/08; H01Q 3/24; H01Q 3/247; Y10S 901/02; Y10S 901/47
See application file for complete search history.

(56) References Cited

U.S. PATENT DOCUMENTS

| 5,150,529 A | 9/1992 | Collingwood |
| 5,235,406 A | 8/1993 | Ishii et al. |
| 5,528,227 A | 6/1996 | Eguchi |
| 5,539,687 A | 7/1996 | Torisawa et al. |

(Continued)

FOREIGN PATENT DOCUMENTS

| CN | 1517187 A | 8/2004 |
| CN | 2688027 Y | 3/2005 |

(Continued)

OTHER PUBLICATIONS

Chinese Office Action dated Sep. 1, 2015 in corresponding Chinese Application No. 201410320856.7.

*Primary Examiner* — Spencer Patton
(74) *Attorney, Agent, or Firm* — Fitzpatrick, Cella, Harper & Scinto

(57) ABSTRACT

A production apparatus ensures wireless communication without interference. An antenna portion 310 at a robotic arm includes a transmitting antenna portion 311 having a plurality of transmitting antennas 321 to 328 and a receiving antenna portion 312 having a plurality of receiving antennas 331 to 338. A transmitting side switcher circuit 361 changes over a transmitting antenna to be connected to a transmitter 351 among the plurality of transmitting antennas 321 to 328 in conjunction with an attitude information of the robotic arm, and changes an effective direction of a directional characteristic of the transmitting antenna portion 311. A receiving side switcher circuit 362 changes over a receiving antenna to be connected to a receiver 352 among the plurality of receiving antennas 331 to 338 in conjunction with the attitude information of the robotic arm and changes the effective direction of the directional characteristic of the receiving antenna portion 312.

18 Claims, 26 Drawing Sheets

(56) References Cited

U.S. PATENT DOCUMENTS

| | | |
|---|---|---|
| 5,708,402 A | 1/1998 | Hachisu et al. |
| 5,760,525 A | 6/1998 | Hachisu et al. |
| 5,815,055 A | 9/1998 | Eguchi et al. |
| 5,917,850 A | 6/1999 | Fujita et al. |
| 6,020,672 A | 2/2000 | Yokota et al. |
| 6,311,436 B1 | 11/2001 | Mimura et al. |
| 6,681,151 B1 | 1/2004 | Weinzimmer et al. |
| 7,606,972 B2 | 10/2009 | Suzuki et al. |
| 7,817,847 B2 | 10/2010 | Hashimoto et al. |
| 7,920,545 B2 | 4/2011 | Eguchi |
| 8,155,047 B2 | 4/2012 | Eguchi |
| 8,184,662 B2 | 5/2012 | Umehara et al. |
| 8,615,192 B2 | 12/2013 | Eguchi |
| 8,626,074 B2 | 1/2014 | Eguchi |
| 8,811,364 B2 | 8/2014 | Eguchi |
| 2013/0055560 A1 | 3/2013 | Nakasugi et al. |
| 2014/0046486 A1 | 2/2014 | Mimura et al. |

FOREIGN PATENT DOCUMENTS

| | | |
|---|---|---|
| CN | 1757492 A | 4/2006 |
| CN | 1853878 A | 11/2006 |
| CN | 101898301 A | 12/2010 |
| CN | 102892557 A | 1/2013 |
| JP | 2006-105782 A | 4/2006 |
| JP | 2011-235398 A | 11/2011 |
| JP | 2011-240443 A | 12/2011 |

PRODUCTION APPARATUS

BACKGROUND OF THE INVENTION

1. Field of the Invention

The present invention relates to a production apparatus which is provided with a robotic arm.

2. Description of the Related Art

In recent years, an assembly production apparatus is demanded which achieves an assembly operation by a robotic arm in place of the assembly operation by a human hand. In the assembly operation by the human hand, in order to efficiently cope with production having a wide variety of products in small quantities, a human cell production system is introduced which removes a conveyor, conveys a workpiece by a human hand, and is responsible for a fixed process; and the human cell production system is rearranged according to a production item. A robot cell is a cell in which one human cell in this human cell production system is replaced with the assembly production apparatus by the robotic arm, and there is a production apparatus described in Japanese Patent Application Laid-Open No. 2011-240443, for instance.

The robotic arm of these production apparatuses has a tool such as a camera and a hand provided at the tip portion thereof, and control signals and image signals to be transmitted to the tool and the hand are usually transmitted/received thereto/therefrom, through cables built into the robotic arm.

However, the cables which are built into the robotic arm are exposed to a severe moving condition. Among the cables, a high-speed communication line which is used for the control and transmission of an image needs a shield and the like, and accordingly has such a drawback that a durability life is short.

In addition, there is the case where the camera or the like becomes unnecessary depending on an assembly process, and is required to be capable of being easily removed. Usually, in such a case, an image communication cable of the camera is routed from the outside of the robotic arm, and accordingly when the robot cell is rearranged, there have been such drawbacks that a complicated operation such as routing of a cable is needed, and a lead time for a start of the apparatus becomes long.

On the other hand, a method is known which improves the drawbacks by abolishing the image communication cable and exchanging such a high-speed signal through a wireless communication in a production apparatus described in Japanese Patent Application Laid-Open No. 2006-105782, for instance.

However, when the wireless communication is performed in the above described production apparatus such as the robot cell, the apparatus results in performing a large number of wireless communications in an extremely narrow area, and accordingly frequency channel for preventing electromagnetic waves from causing interference between adjacent production apparatuses becomes insufficient.

In recent years, in particular, a tool control signal of a camera, a robot hand and the like which are used in FA has been increasingly required to increase the speed, and in order to cope with the increase, a wireless unit is required to take measures of changing the frequency to a high band for securing the band, and the like.

In millimeter wave communication by a band of 60 GHz which is often used in high-speed wireless communication of an image, for instance, the number of channels which can be legally permitted is only four channels. In such a case, when there are four or more other production apparatuses which are adjacent to the production apparatus, there has been the case where the production apparatuses cannot be discriminated by the frequencies.

For this reason, when the wireless communication is heavily used in the production apparatus such as the robot cell, which has been described above, the interference of the communication occurs among the adjacent production apparatuses, and there have been problems that an error occurs due to a great decrease of a transmission speed of the wireless communication and an increase in a waiting time of the wireless unit, and that the production apparatus stops.

An object of the present invention is to provide a production apparatus which can stably perform wireless communication while avoiding the interference of communication with other production apparatuses.

SUMMARY OF THE INVENTION

According to an aspect of the present invention, a production apparatus comprising: a robotic arm; a first antenna unit having a directional characteristic and being supported by the robotic arm; a first wireless unit connected to the first antenna unit; a working access platform having a working portion placed lower than a movable space of the first antenna unit; a frame body having a top portion placed higher than the movable space of the first antenna unit; a second antenna unit having a directional characteristic effective in a direction to the first antenna unit antenna unit, and being supported by the working portion or the top portion; and a second wireless unit connected to the second antenna unit, to perform a wireless communication with the first wireless unit through the first and second antenna units; and a first changing unit configured to change an effective direction of the directional characteristic of the first antenna unit in conjunction with an operation of the robotic arm, such that the second antenna unit is kept within an effective characteristic area of the first antenna unit.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1A:
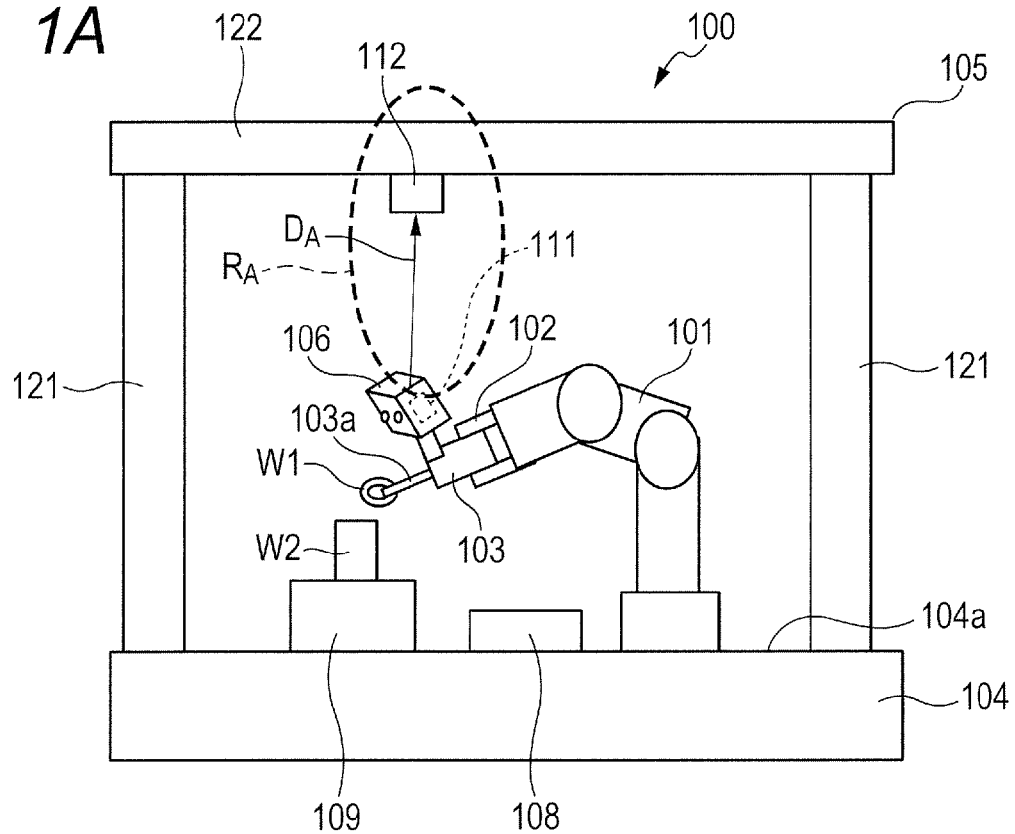
FIGS. 1A and 1B are explanatory views illustrating a schematic configuration of a production apparatus according to a first embodiment.
Figure 1B:
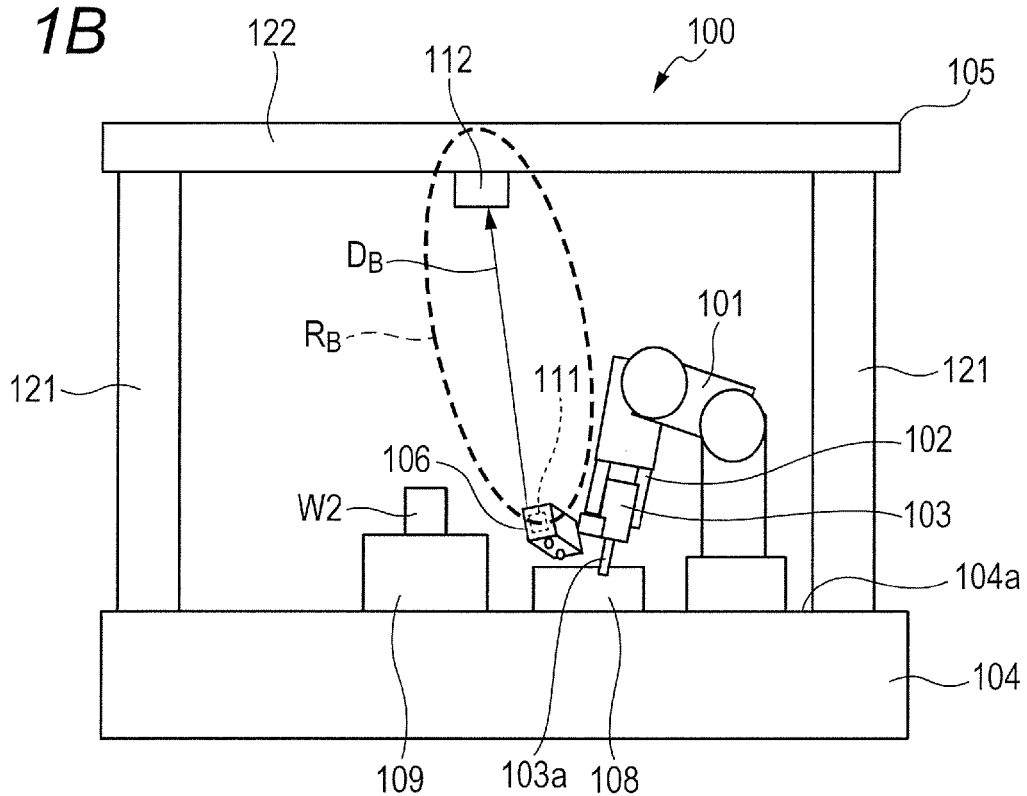

FIGS. 1A and 1B are explanatory views illustrating a schematic configuration of a production apparatus according to a first embodiment of the present invention. FIG. 1A and FIG. 1B are explanatory views each illustrating the schematic configuration of the production apparatus, but attitudes of robotic arms which are positioned when an acquired image is transmitted are different from each other.

A production apparatus 100 illustrated in FIG. 1A and FIG. 1B is a production apparatus which attaches a component W1 to a workpiece W2 of a main body. The production apparatus 100 is a so-called robot cell, and a production apparatus having an approximately similar configuration to that of the production apparatus 100 is arranged to be adjacent to the production apparatus 100, though the illustration is omitted. The production apparatus 100 is provided with a robotic arm 101, a robot hand 102 which is attached to the tip of the robotic arm 101 and functions as an end effector, and a tool 103 which is grasped by the robot hand 102.

The robotic arm 101 is a multi-joint (six joints, for instance) robotic arm. The robot hand 102 is a multi-fingered robot hand (three fingers, for instance). The tool 103 is a tweezers tool having a pair of tweezers 103a, which is configured so as to be opened/closed in conjunction with an input control signal.

In addition, the production apparatus 100 is provided with a working access platform 104 which has a working surface 104a that is a working portion, and a frame body 105 which has a frame structure having an approximately rectangular parallelepiped shape. This working surface 104a is a flat surface, and the workpieces W1 and W2 are mounted directly or indirectly on the working surface 104a. Incidentally, the case will be described below in which the working portion is the working surface. However, the working surface is not limited to a flat shape, and may have unevenness.

In addition, the production apparatus 100 is provided with an on-hand camera (hereinafter referred to simply as "camera") 106 which is a wireless camera apparatus. The camera 106 is fixed on the tool 103. Incidentally, the camera 106 is provided with a first antenna portion and a wireless station 111 that has the first wireless unit and functions as a first wireless station, which will be described later.

The production apparatus 100 is also provided with a wireless station 112 which functions as a second wireless station for performing wireless communication with the wireless station 111 built into the camera 106. An electromagnetic wave such as a millimeter wave and light which have strong directional characteristics is used for the wireless communication between these wireless stations 111 and 112.

The working access platform 104 is required to have a mechanical strength, and accordingly is firmly formed from metal such as aluminum. The base end of the robotic arm 101 is fixed to the working surface 104a of the working access platform 104. For information, the robotic arm 101 may be fixed to another structure than the working access platform 104, and also may be fixed, for instance, to another structure such as the frame body 105, a floor surface and a wall surface.

In addition, a component tray 108 on which the component W1 is mounted and a workpiece mounting table 109 on which the workpiece W2 is mounted are mounted on the working surface 104a of the working access platform 104.

By the robot hand 102, the tool 103 is grasped, and the tweezers 103a of the tool 103 can grasp the component W1 which is arranged in a component tray 108, and can attach the component W1 to the workpiece W2. At this time, the camera 106 which has the wireless station 111 built-in is fixed to the tool 103, and accordingly results in being supported by the robotic arm 101 through the tool 103 and the robot hand 102, when the tool 103 is grasped by the robot hand 102.

The frame body 105 is fixed to the working surface 104a of the working access platform 104. For information, the frame body 105 may be fixed to another structure than the working access platform 104, or may also be fixed directly, for instance, to the floor surface, so as to prevent the vibration of the robotic arm 101 and the like from directly reaching the frame body. The wireless station 112 is arranged on the working access platform 104 so as to be relatively non-movable, and specifically is supported (fixed) by the frame body 105.

The frame body 105 has a plurality (four, for instance, though two is illustrated in FIG. 1A) of strut members 121 which vertically extend, as a strut portion, and a top portion 122 which is fixed to the upper end of each of the strut members 121 and is supported by each of the strut members 121. The strut member 121 is formed, for instance, from metal. In addition, the top portion 122 is formed, for instance, of a beam member, a top board and the like, and is arranged on the upper part of the working access platform 104. This top board can be, for instance, a non-metallic plate such as a plastic. Thereby, an electromagnetic wave (wireless signal) which has been emitted from the camera 106 pass through the top board of the top portion 122, and accordingly results in not being reflected by the top board. Incidentally, the top portion 122 has been described to have the top board. However, when there is no influence of ambient light such as lighting on a ceiling, the top board may not be provided. At this time, the wireless station 112 may be provided directly on the beam member of the top portion 122.

The camera 106 having the wireless station 111 therein changes the position and the attitude in conjunction with the operation of the robotic arm 101. The working surface 104a of the working access platform 104 is placed lower than a movable space of the camera 106 (in other words, wireless station 111 having antenna portion), which is associated with the operation of the robotic arm 101. In addition, the top portion 122 of the frame body 105 is placed higher than the movable space of the camera 106 (in other words, wireless station 111 having antenna portion), which is associated with the operation of the robotic arm 101. The wireless station 112 is supported by any one of the working surface 104a and the top portion 122, and in the present embodiment, by the top portion 122.

Here, FIG. 1A and FIG. 1B represent mutually different scenes which are imaged by the camera 106, in the production apparatus 100. FIG. 1A illustrates a scene in which positions of the workpiece W2, the component W1 and the tweezers 103a are measured with the use of the camera 106, and a deviation of the position from an initial instruction is corrected. In addition, FIG. 1B illustrates a scene in which a presence or absence of the component W1 in the component tray 108 is inspected when the component W1 is taken out therefrom, the attitude of the component W1 is measured, and the instructed attitude is corrected. In any of the scenes, the robotic arm 101 holds a stationary state in an attitude taken when the workpiece is imaged, and a wireless signal such as an image signal is communicated between the wireless stations 111 and 112 in the state in which the robotic arm 101 keeps the attitude.

In FIG. 1A and FIG. 1B, arrows $D_A$ and $D_B$ show an effective direction of a directional characteristic of the antenna portion in the wireless station 111 which the camera 106 has, and dashed lines $R_A$ and $R_B$ show the directional characteristic of the antenna portion. As are illustrated in FIG. 1A and FIG. 1B, the attitudes of the robotic arm 101 are different from each other in the scenes, and thereby the attitudes of the camera 106 which is supported by the tip of the robotic arm 101 are also greatly different from each other. Because of this, in order that communication is performed between the wireless station 111 which the camera 106 has and the wireless station 112 which is supported by the frame body 105, in each of the attitudes of the robotic arm 101, it is necessary to change the effective direction of the directional characteristic of the antenna portion of the camera 106 in conjunction with the operation of the robotic arm 101.

In the first embodiment, the effective direction of the directional characteristic of the antenna portion in the wireless station 111 in the camera 106 is changed, and thereby the effective direction of the directional characteristic of the antenna portion is changed for every scene (attitude of robotic arm 101) to be imaged. The production apparatus performs wireless communication between the wireless station 111 in the camera 106 and the wireless station 112 in a vertical direction to a plane on which the production apparatus 100 is installed, thereby significantly lowering the intensity of the electromagnetic wave in a direction in which the electromagnetic wave heads for the other adjacent production apparatus, and preventing interference of the electromagnetic wave.

Incidentally, the point is the configuration for directing the effective direction of the directional characteristic of the antenna portion which the camera 106 has, toward the wireless station 112, in conjunction with the operation of the robotic arm 101, but the configuration will be described in detail below.

Figure 2:
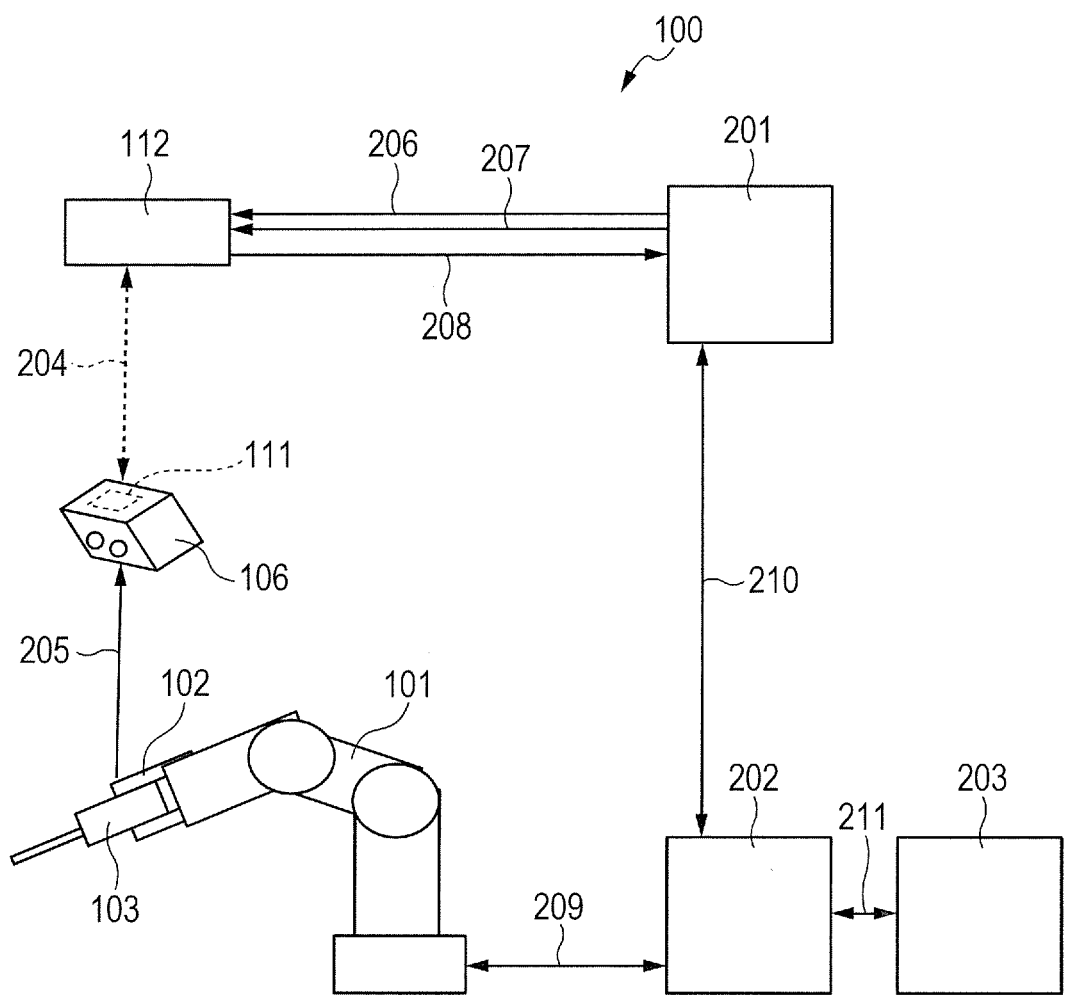
FIG. 2 is a control block diagram of the production apparatus according to the first embodiment.

FIG. 2 is a control block diagram of the production apparatus 100 according to the first embodiment. The production apparatus 100 is provided with an image processing apparatus (vision controller) 201, a robot control apparatus (robot controller) 202 which functions as a robot controlling unit, and a sequencer 203.

The image processing apparatus 201 controls the camera 106 and the wireless station 112, obtains a necessary acquired image in an appropriate scene, and performs image processing. The robot control apparatus 202 controls the robotic arm 101, the robot hand 102 and the tool 103, and makes the sections perform necessary operations. The sequencer 203 controls not only the robotic arm 101 and the robot hand 102, but also the whole production apparatus which includes equipment such as a component supply machine and ON/OFF of a compressed air, other than the robot.

The wireless station 112 and the image processing apparatus 201 are connected by at least three communication lines 206, 207 and 208.

The image processing apparatus 201 transmits a trigger signal for the camera 106, to the wireless station 112 through the trigger line 206. In addition, the image processing apparatus 201 transmits a serial control signal which performs the setting of the camera 106, and the like, to the wireless station 112 through the serial control line 207. The wireless station 112 transmits an image signal which has been obtained from the camera 106, to the image processing apparatus 201 through the image signal line 208.

The wireless station 111 which is built into the camera 106 and the wireless station 112 are connected by a wireless path 204. The camera 106 and the tool 103 are connected by a power source line 205, and an electric power is supplied to the camera 106 from the side of the tool 103 through the power source line 205.

The robot control apparatus 202, the robotic arm 101, the robot hand 102 and the tool 103 are connected by a high-speed serial control line 209 such as FlexRay.

The robot control apparatus 202 transmits a control signal to the robotic arm 101 and the like through the control line 209 to move the robotic arm 101 and the like, and acquires various detection signals from the robotic arm 101 and the like. For instance, the robot control apparatus 202 reads out information on an encoder and the like through the control line 209, controls a motor which is built into the robotic arm 101, and thereby makes the robotic arm 101 perform a predetermined operation according to a predetermined instruction program. Specifically, the robot control apparatus 202 transmits a control signal to the robotic arm 101, and controls the attitude of the robotic arm 101.

The robot control apparatus 202 and the image processing apparatus 201 are connected, for instance, by a communication line 210 such as Ethernet (registered trademark), and information is exchanged between the robot control apparatus 202 and the image processing apparatus 201. For instance, the robot control apparatus 202 and the image processing apparatus 201 exchange information on an imaging command to the camera 106, a deviation amount from an instruction point, which is the result of the imaging, and the like. In the present embodiment, the robot control apparatus 202 transmits information (attitude information) on the attitude of the robotic arm 101, to the image processing apparatus 201 through the communication line 210.

The sequencer 203 and the robot control apparatus 202 are connected by the communication line 211 such as CC-LINK.

Figure 3A:
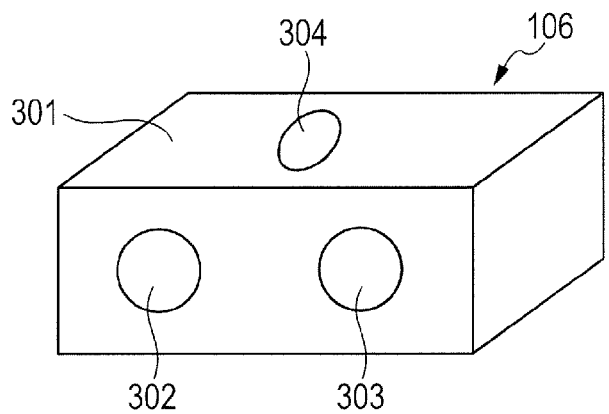
FIGS. 3A, 3B and 3C are explanatory views illustrating an on-hand camera in the first embodiment.
Figure 3B:
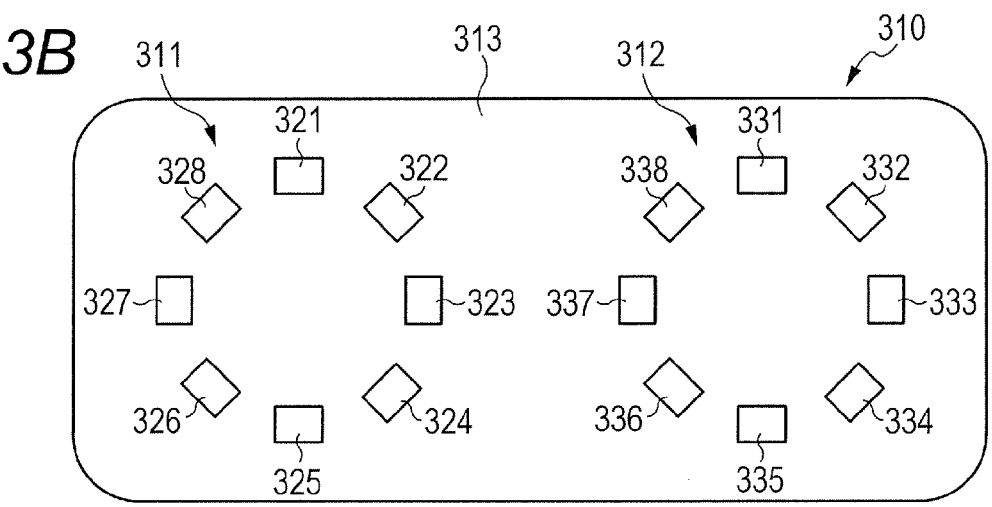
Figure 3C:
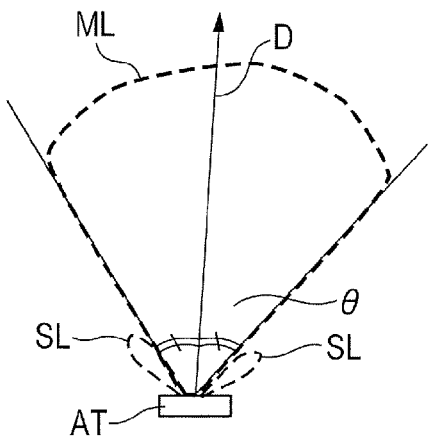

FIGS. 3A, 3B and 3C are explanatory views illustrating the on-hand camera. FIG. 3A is a contour view illustrating the on-hand camera; FIG. 3B is a plan view of the antenna portion; and FIG. 3C is an explanatory view illustrating a directional characteristic of an antenna.

As is illustrated in FIG. 3A, the camera 106 has a housing 301, and the wireless station 111 (FIGS. 1A and 1B) is accommodated in the inner part of the housing 301. In addition, the camera 106 is a stereo camera, and has lenses 302 and 303 for at least two optical systems. The lenses 302 and 303 are provided on the front face of the housing 301, and an aperture 304 which exposes the antenna portion 310 that is the first antenna portion in the wireless station 111 is formed on the upper face of the housing 301. Specifically, in the present embodiment, the camera 106 has the wireless station 111 built-in which has the antenna portion 310 and the first wireless unit that is connected to the antenna portion 310 and will be described later. Accordingly, the antenna portion 310 is fixed to the tool 103, and accordingly is supported indirectly by the robotic arm 101.

As is illustrated in FIG. 3B, the antenna portion 310 is an antenna unit (wireless IC chip) which has an insulating substrate 313, and has a transmitting antenna portion 311 and a receiving antenna portion 312 that are arranged on the insulating substrate 313. The transmitting antenna portion 311 is formed of a plurality of transmitting antennas 321 to 328 which have each the directional characteristic. The transmitting antennas 321 to 328 are arranged so that the effective directions of the directional characteristic are different from each other. Similarly, the receiving antenna portion 312 is formed of a plurality of receiving antennas 331 to 338 which have each the directional characteristic. The receiving antennas 331 to 338 are arranged so that the effective directions of the directional characteristic are different from each other. These antennas 321 to 328 and 331 to 338 are patch antennas, and each have the directional characteristic.

Here, the directional characteristic and the effective direction of the directional characteristic of the antenna will be supplementarily described below with reference to FIG. 3C. The antenna AT shown in FIG. 3C is an antenna having the directional characteristic which has a similar configuration to that of each of the antennas 321 to 328 and 331 to 338 in FIG. 3B. In FIG. 3C, an angular distribution of the intensity of a radio wave is illustrated which is generated from the antenna AT. The figure is a distribution view illustrating how much the intensity of the radio wave depends on the angle, when the intensity of the radio at the angle having the maximal intensity is determined to be 1.

Incidentally, as for the radiation of the electromagnetic waves from the antenna AT, there are generally a main lobe ML which emits an electromagnetic wave in a main direction of the radiation, and a side lobe SL which is generated in both sides or one side thereof. Hereafter, only the radiation by the main lobe ML will be described, and the description concerning the side lobe SL will be omitted.

In FIG. 3C, θ is a representative value indicating a spread of the directional characteristic, is an angle which keeps a half value of the intensity of the electromagnetic field, and is referred to as a directional angle as well. In the electromagnetic wave having a strong directional characteristic, in general, the intensity of the electromagnetic field is rapidly lowered in the outside of the directional angle θ, and accordingly an angle range within this directional angle θ is often used as a communicable region. Incidentally, in the present embodiment, a direction which the middle point of the directional angle θ points is determined to be an effective direction D of the directional characteristic. In addition, the antenna having the directional characteristic means an antenna having such a degree of a directional characteristic that radio waves in a range of the above described directional angle θ does not enter directly into an adjacent production apparatus. A communication device which is suitable for wireless communication waves having such a directional characteristic includes a wireless unit which uses a radio wave having a wavelength of a millimeter wave or shorter or light.

Figure 4:
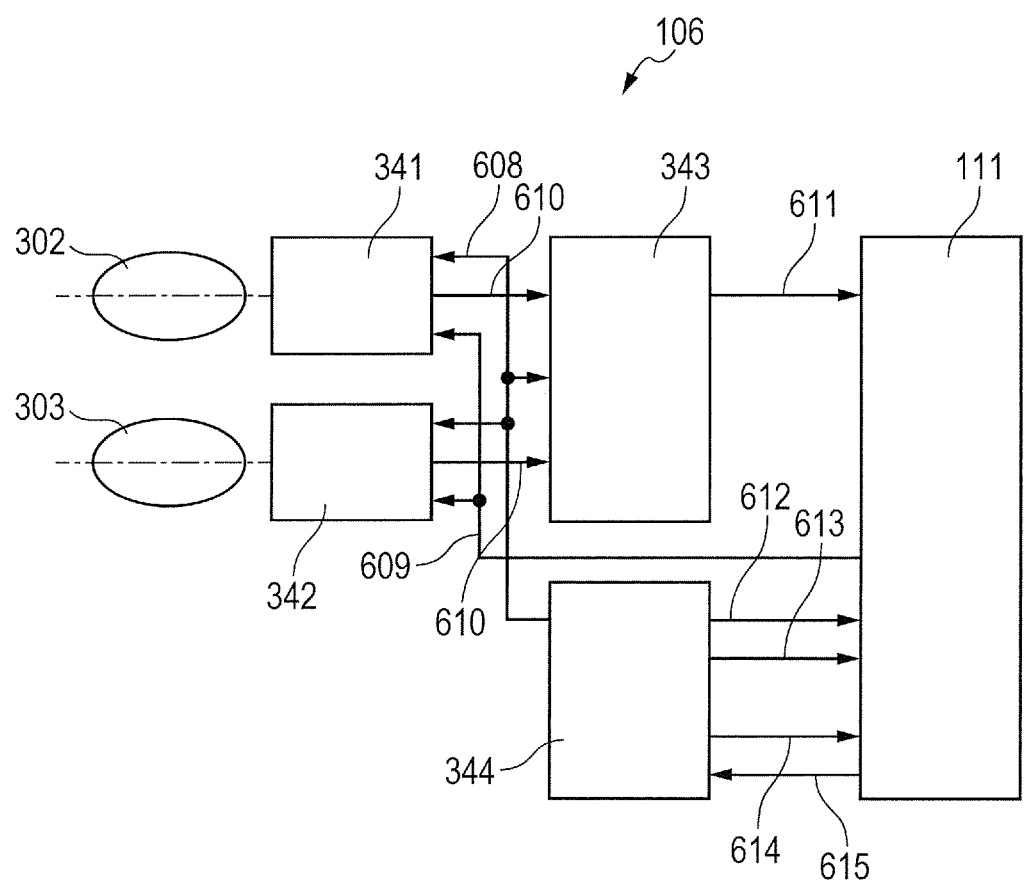
FIG. 4 is a block diagram illustrating a configuration of the on-hand camera in the first embodiment.

FIG. 4 is a block diagram illustrating a configuration of a camera 106. The camera 106 has lenses 302 and 303 which function as an optical system, and image sensors (for instance, CMOS image sensor or CCD image sensor) 341 and 342 which are arranged so as to oppose to the lenses 302 and 303. Incidentally, in the present embodiment, the camera 106 is a stereo camera, and accordingly has at least two image sensors. In recent years, an image sensor has been increasingly digitized, an image signal is output in a digital form from the image sensor, and in addition, a position, a size, a gain and the like which are read out from the image sensor can be set by a serial control signal sent from the outside.

In addition, the camera 106 is provided with an image signal processing circuit 343 which is formed of FPGA and the like, a microcomputer (microcomputer) 344 which functions as a control unit that controls the whole camera 106, and a wireless station 111 which has an antenna portion 310 illustrated in FIGS. 3A to 3B therein.

The image signal processing circuit 343 captures the image signal based on an image acquired by image sensors 341 and 342 through a signal line 610, converts the form into a predetermined image format, and transmits the converted image format to the wireless station 111 through a signal line 611. Incidentally, in the first embodiment, the image (RAW image data) acquired by the image sensors 341 and 342 is converted into a predetermined image format, but if the acquired image does not need to be converted, the image signal may be transmitted to the wireless station 111 as it is.

The wireless station 111 receives a serial control signal which performs the setting of the image sensors 341 and 342, and the like, and a trigger signal that indicates the imaging timing for the image sensors 341 and 342, from the wireless station 112. Then, the wireless station 111 transmits the trigger signal to each of the image sensors 341 and 342 through a control line 609, and transmits the serial control signal to the microcomputer 344 through a control line 615.

The microcomputer 344 receives the serial control signal, and performs various settings of the image sensors 341 and 342 through a control line 608. In addition, the microcomputer 344 receives the serial control signal, and transmits a signal for changing over the antennas 321 to 328 and the antennas 331 to 338 in FIG. 3B, to the wireless station 111 through control lines 612 and 613. Thereby, the effective direction of the directional characteristic of the antenna portion 310 is changed to the predetermined effective direction of the directional characteristic according to each of the scenes.

Figure 5:
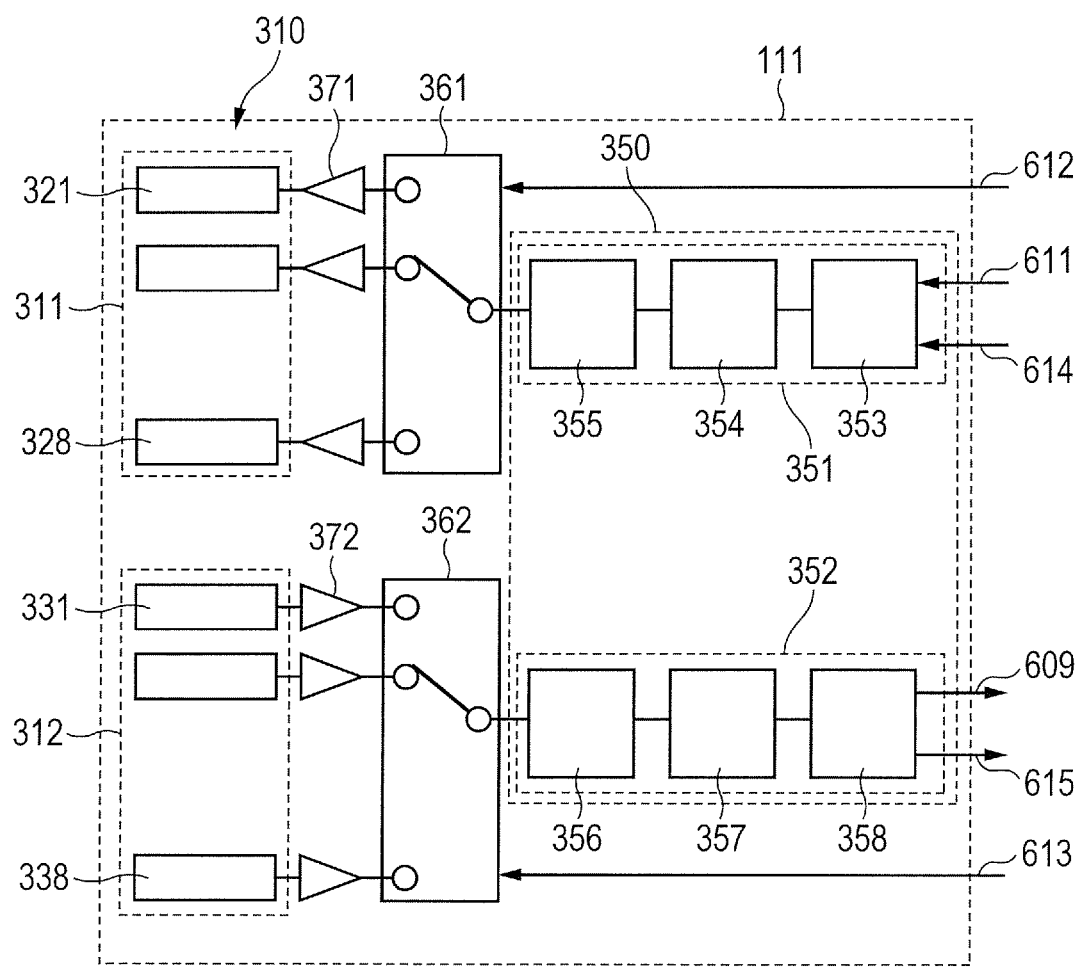
FIG. 5 is a block diagram illustrating a configuration of a first wireless station in the first embodiment.

FIG. 5 is a block diagram illustrating a configuration of the wireless station 111. The wireless station 111 has a wireless unit 350 which is a first wireless unit, and a transmitting side switcher circuit 361 and a receiving side switcher circuit 362 which are the first changing unit and the changeover unit. In addition, the wireless station 111 has a plurality of driver circuits 371 which are connected between each of the transmitting antennas 321 to 328 of the transmitting antenna portion 311 and each of the terminals of the transmitting side switcher circuit 361, respectively. In addition, the wireless station 111 has a plurality of LNA (Low Noise Amplifier) circuits 372 which are connected between each of the receiving antennas 331 to 338 of the receiving antenna portion 312 and each of the terminals of the receiving side switcher circuit 362, respectively.

The driver circuits 371 transmits the signal which has been input from the transmitting side switcher circuit 361, to the corresponding transmitting antennas 321 to 328, respectively. In addition, the LNA circuits 372 amplify the signal which has been input from the corresponding receiving antennas 331 to 338, respectively, and transmit the amplified signal to the receiving side switcher circuit 362.

The wireless unit 350 has a transmitter 351 which is a first transmitter that transmits a radio signal (RF signal), and a receiver 352 which is a first receiver that receives a radio signal (RF signal). The transmitter 351 has a communication signal processing circuit 353, a baseband conversion circuit 354 and an RF conversion circuit 355. The receiver 352 has a baseband conversion circuit 356, a digital conversion circuit 357 and a communication signal processing circuit 358.

The above described wireless unit 350 is connected to the transmitting antenna portion 311 of the antenna portion 310 through the transmitting side switcher circuit 361 and the driver circuits 371. The wireless unit 350 is also connected to the receiving antenna portion 312 of the antenna portion 310 through the receiving side switcher circuit 362 and the LNA circuits 372.

The communication signal processing circuit 353 of the transmitter 351 receives the image signal from the image signal processing circuit 343 (FIG. 4), through the signal line 611. In addition, the communication signal processing circuit 353 receives a serial control signal from the microcomputer 344 (FIG. 4), through a control line 614. The communication signal processing circuit 353 arbitrates and packetizes these signals to form a communication logical layer.

The baseband conversion circuit 354 receives a signal from the communication signal processing circuit 353, and converts the signal into an analog baseband signal.

The RF conversion circuit 355 modulates the analog baseband signal converted by the baseband conversion circuit 354 to a superhigh frequency of 60 GHz, for instance, and converts the signal into an RF signal (radio signal).

The transmitting side switcher circuit 361 connects one transmitting antenna among the plurality of transmitting antennas 321 to 328, with the transmitter 351, in conjunction with a changeover signal which has been input through a control line 612. Specifically, the transmitting side switcher circuit 361 changes over a transmitting antenna to be connected to the transmitter 351 through a driver circuit 371, in conjunction with the changeover signal. Thereby, the switcher circuit 361 receives the changeover signal which is transmitted from the microcomputer 344 (FIG. 4) through the control line 612, changes over a transmitting antenna to be connected to the transmitter 351 in conjunction with the changeover signal, and changes an effective direction of the directional characteristic of the transmitting antenna portion 311.

The receiving side switcher circuit 362 connects one receiving antenna among the plurality of receiving antennas 331 to 338, with the receiver 352, in conjunction with the changeover signal which has been input through the control line 613. Specifically, the receiving side switcher circuit 362 changes over the receiving antenna to be connected to the receiver 352 through the LNA circuit 372, in conjunction with the changeover signal. Thereby, the switcher circuit 362 receives the changeover signal which is transmitted from the microcomputer 344 (FIG. 4) through the control line 613, changes over the receiving antenna to be connected to the receiver 352 in conjunction with the changeover signal, and changes the effective direction of the directional characteristic of the receiving antenna portion 312.

The baseband conversion circuit 356 demodulates the RF signal from the LNA circuit 372, and converts the demodulated signal into a baseband signal. The digital conversion circuit 357 converts the baseband signal into a digital signal. The communication signal processing circuit 358 depacketizes the digital signal, and forms a communication logical layer which converts the signal into a trigger signal and a serial control signal. Then, the communication signal processing circuit 358 outputs the trigger signal to the image sensors 341 and 342 (FIG. 4) through the control line 609, and outputs the serial control signal to the microcomputer 344 (FIG. 4) through the control line 615.

Figure 6:
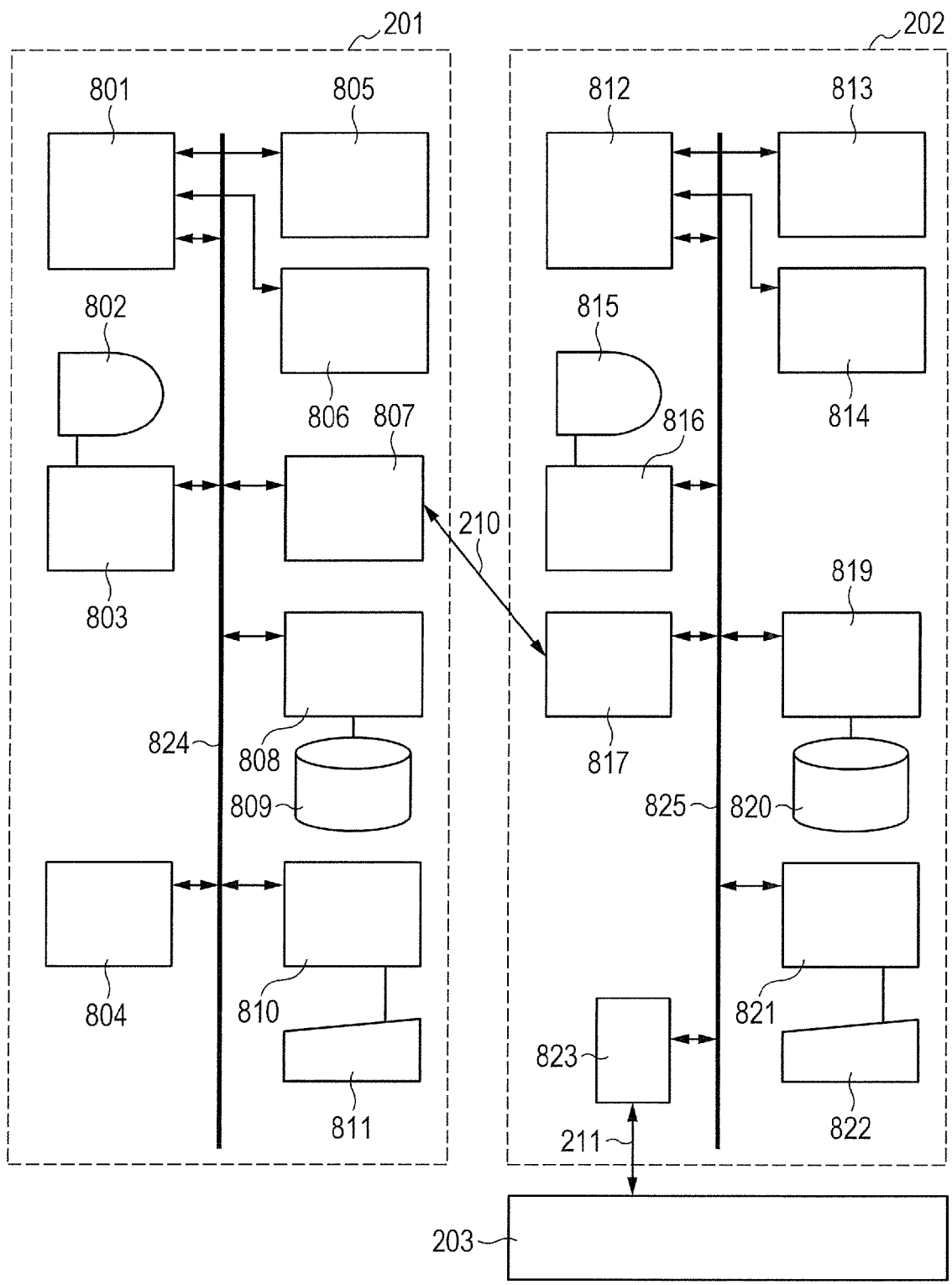
FIG. 6 is a block diagram illustrating a configuration of an image processing apparatus and a robot control apparatus.

FIG. 6 is a block diagram illustrating a configuration of an image processing apparatus 201 and a robot control apparatus 202.

The image processing apparatus 201 has a CPU chip set 801 which includes a CPU core, an I/O controller and a memory controller, a DDR memory 805, and a ROM 806 which stores a program therein. The ROM 806 stores, for instance, a boot program therein. In addition, the image processing apparatus 201 has an external bus 824 for being connected to peripheral equipment. A bus such as PCI-EXPRESS, for instance, can be used as the external bus 824. The image processing apparatus 201 has also a graphics controller 803, and a monitor 802 on which a status of the image processing apparatus 201 is displayed by the control of the graphic controller 803. In addition, the image processing apparatus 201 has an HDD 809 which functions as an external storage apparatus that is connected to the external bus 824 through the interface circuit 808, and a keyboard 811 which is connected to the external bus 824 through a general USB interface controller 810. The image processing apparatus 201 has a communication controller 807 for performing communication with the robot control apparatus 202, and a camera link grabber board 804 for performing communication with the wireless station 112, as a peculiar interface board.

The robot control apparatus 202 has a CPU chip set 812 which includes a CPU core, an I/O controller and a memory controller, a DDR memory 813, and a ROM 814 which stores the program therein. The ROM 814 stores, for instance, the boot program therein. The robot control apparatus 202 has also an external bus 825 for being connected to peripheral equipment. A bus such as PCI-EXPRESS, for instance, can be used as the external bus 825. In addition, the robot control apparatus 202 has a graphics controller 816, and a monitor 815 on which a status of the robot control apparatus 202 is displayed by the control of the graphic controller 816. The robot control apparatus 202 has also an SSD 820 which functions as an external storage apparatus that is connected to the external bus 825 through the interface circuit 819, and a keyboard 822 which is connected to the external bus 825 through a general USB interface controller 821. The robot control apparatus 202 has a communication controller 817 for performing communication with the image processing apparatus 201, and a CC-LINK controller 823 for being connected to the sequencer 203, as a peculiar interface board.

Figure 7A:
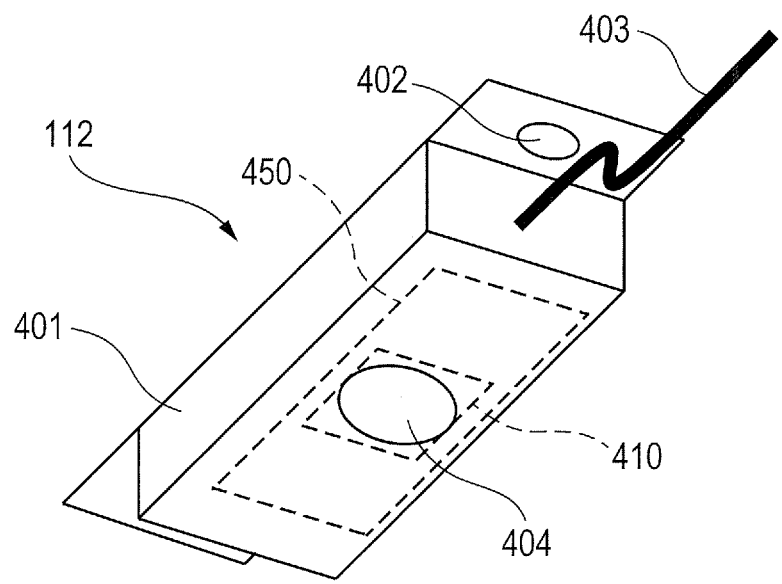
FIGS. 7A and 7B are explanatory views illustrating a second wireless station in the first embodiment.
Figure 7B:
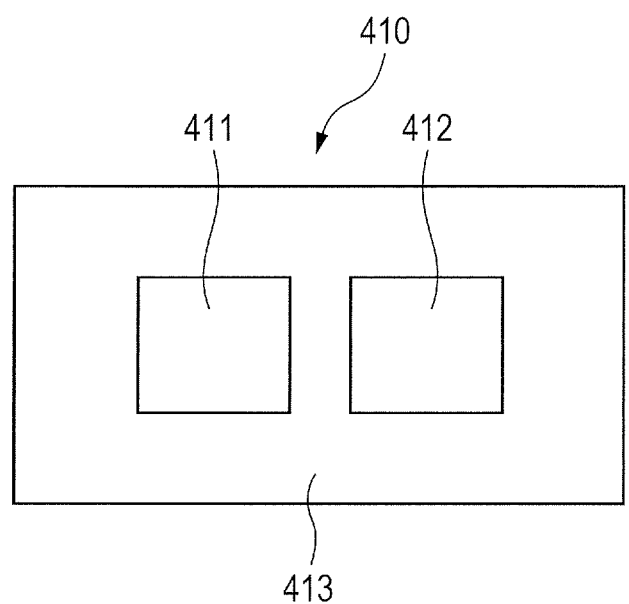

FIGS. 7A and 7B are explanatory views illustrating a wireless station 112. FIG. 7A is a contour view of the wireless station 112; and FIG. 7B is a plan view illustrating a second antenna portion which the wireless station 112 has.

The wireless station 112 has: a housing 401; and an antenna portion 410 that is a second antenna portion having a directional characteristic, and a wireless unit 450 that is a second wireless unit connected to the antenna portion 410, which are accommodated in the housing 401.

The housing 401 has a screw hole 402 for being attached to the top portion 122 (FIGS. 1A and 1B) of the frame body 105, and an aperture 404 for exposing the antenna portion 410 formed therein. The above described trigger line 206, serial control line 207 and image signal line 208 (FIG. 2) are each a communication line of a camera link standard, which is connected to the image processing apparatus 201 (FIG. 2), and are integrated into one cable 403. The housing 401 is attached to the top portion 122 of the frame body 105, and accordingly the antenna portion 410 results in being supported indirectly by the top portion 122 of the frame body 105.

As is illustrated in FIG. 7B, the antenna portion 410 which is connected to the wireless unit 450 has: an insulating substrate 413; and a transmitting antenna 411 that functions as a second transmitting antenna portion, and a receiving antenna 412 that functions as a second receiving antenna portion, which are arranged on the insulating substrate 413. These antennas 411 and 412 are patch antennas, and each have the directional characteristic. Incidentally, the antenna portion 410 in the present embodiment is not provided with a device of changing the effective direction of the directional characteristic.

Figure 8:
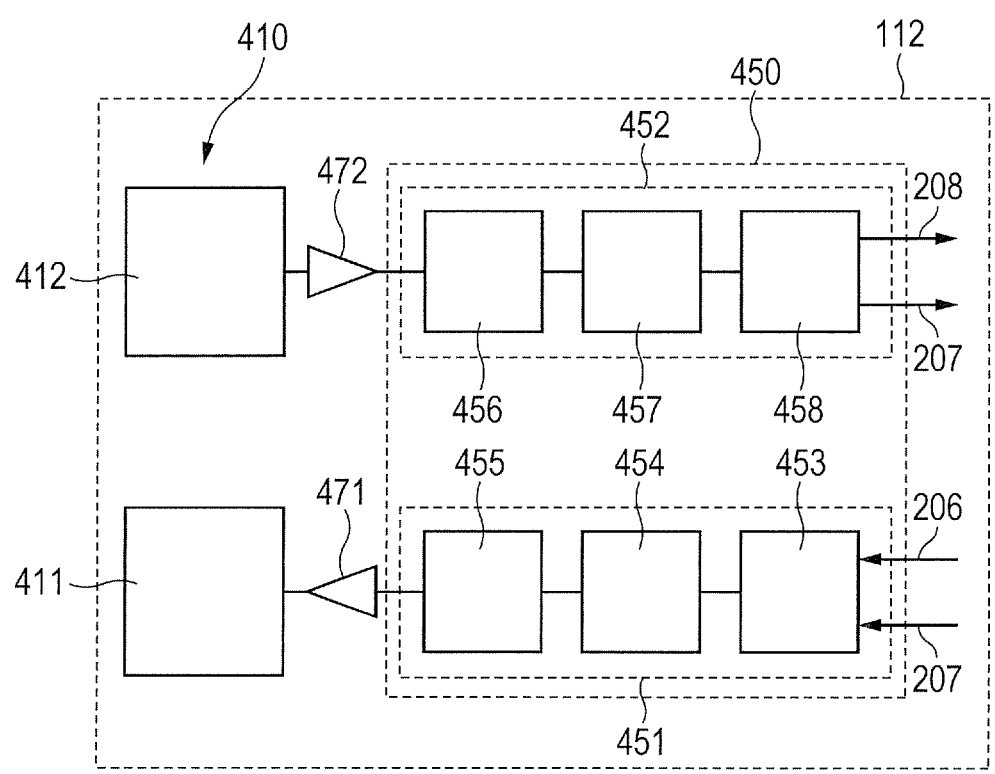
FIG. 8 is a block diagram illustrating a configuration of the second wireless station in the first embodiment.

FIG. 8 is a block diagram illustrating a configuration of the wireless station 112. The wireless station 112 has the antenna portion 410 which is the second antenna portion, and the wireless unit 450 which is the second wireless unit. This wireless unit 450 performs wireless communication with the wireless unit 350 through the antenna portion 310 and the antenna portion 410.

Specifically, the wireless unit 450 has a transmitter 451 which is a second transmitter that transmits a radio signal (RF signal), and a receiver 452 which is a second receiver that receives a radio signal (RF signal). In addition, the wireless station 112 has a driver circuit 471 which is connected between a transmitting antenna 411 of the antenna portion 410 and the transmitter 451, and an LNA circuit 472 which is connected between a receiving antenna 412 of the antenna portion 410 and the receiver 452.

The transmitter 451 has a communication signal processing circuit 453, a D/A conversion circuit 454 and a modulation circuit 455. The receiver 452 has a demodulation circuit 456, an A/D conversion circuit 457 and a communication signal processing circuit 458.

The communication signal processing circuit 453 receives the trigger signal from the image processing apparatus 201 (FIG. 2) through the trigger line 206, and receives the serial control signal through the serial control line 207. The communication signal processing circuit 453 subjects the trigger signal and the serial control signal to packetizing processing to convert the signals into one digital signal. The D/A conversion circuit 454 converts the digital signal into an analog baseband signal. The modulation circuit 455 modulates the analog baseband signal to a superhigh frequency of 60 GHz, and converts the signal into an RF signal. The driver circuit 471 transmits the RF signal to the transmitting antenna 411.

The LNA circuit 472 amplifies an output (RF signal) sent from the receiving antenna 412. The demodulation circuit 456 demodulates the output (RF signal) of the LNA circuit 472 to a baseband signal. The A/D conversion circuit 457 converts the demodulated baseband signal into a digital signal. The communication signal processing circuit 458 depacketizes the digital signal, and forms a communication logical layer which distributes the signal into the image signal that has been transmitted from the camera 106 and the serial control signal. The communication signal processing circuit 458 transmits the image signal to the image processing apparatus 201 (FIG. 2) through the image signal line 208, and transmits the serial control signal to the image processing apparatus 201 through the serial control line 207.

Figure 9:
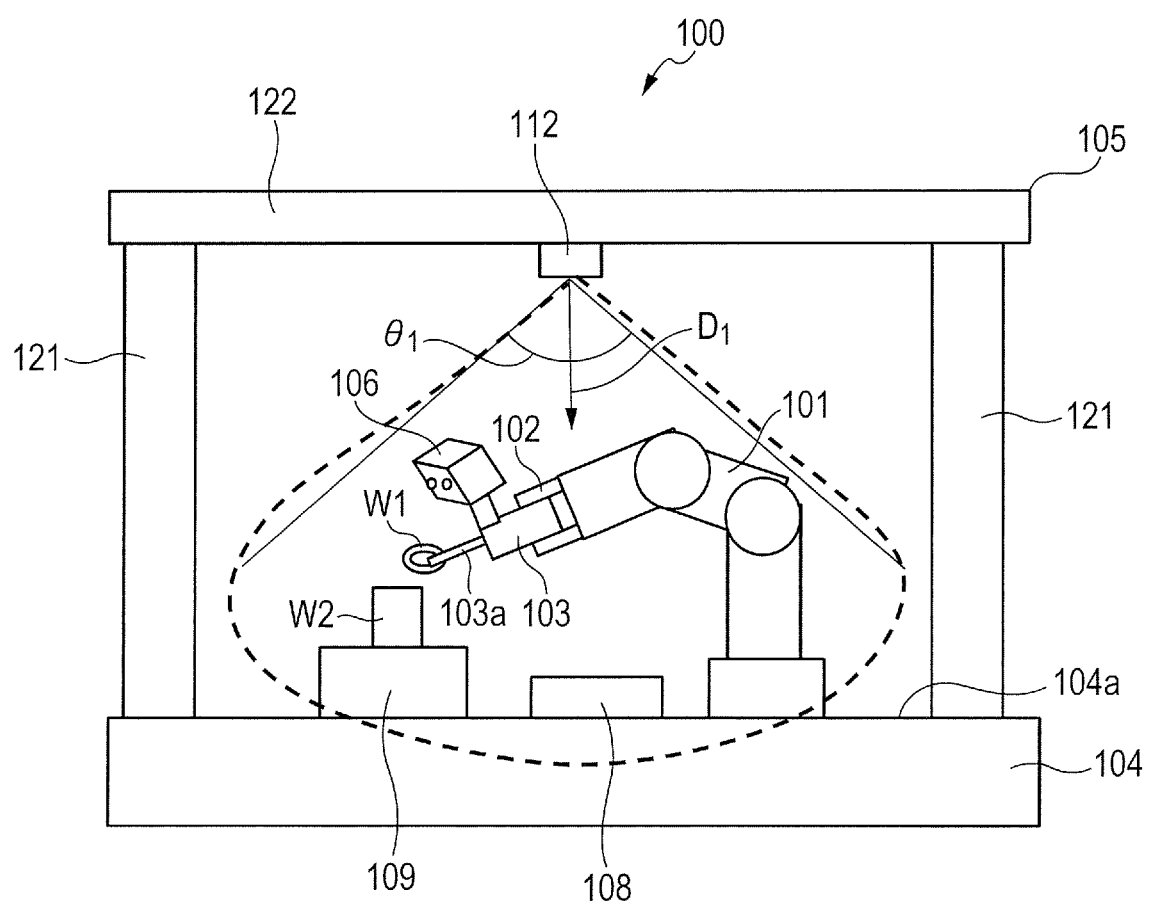
FIG. 9 is an explanatory view illustrating the state in which the second wireless station is fixed to a top portion of a frame body.

FIG. 9 is an explanatory view illustrating the state in which a wireless station 112 is fixed to a top portion 122 of a frame body 105. The effective direction $D_1$ of the directional characteristic of the antenna portion 410 of the wireless station 112 is configured to point a right lower direction so that the effective direction becomes perpendicular to the installation surface of the production apparatus 100. Each of the antennas 411 and 412 of the antenna portion 410 in the wireless station 112 is configured to be a single patch antenna, thereby a directional angle $\theta_1$ can be set to be wide, and the directional angle $\theta_1$ having an approximately 60 degrees is achieved. Specifically, the effective direction of the directional characteristic of the antenna portion 410 is headed for the antenna portion 310.

In the present embodiment, it is supposed that the robotic arm 101 is instructed to operate so that the wireless station 111 of the camera 106 fits into the range of this directional angle $\theta_1$. The image processing apparatus 201 controls the camera 106 so as to change over the antennas built into the camera 106 for every imaging scene so that the effective direction of the directional characteristic of the antenna portion 310 becomes closest to a straight line which connects the wireless station 112 with the camera 106.

A changeover sequence of the antenna portion 310 will be described in more detail below. Firstly, the robotic arm 101 operates according to the instructed operation which is memorized in an SSD 820 and the like of the robot control apparatus 202, in FIG. 6. The operation is instructed when the production apparatus 100 is set up, and the imaging scene and the attitude of the camera 106 are determined for every scene, at this time. Thereby, the number of the optimal antenna for an imaging scene, in the antenna portion 310 in the wireless station 111 in the camera 106, is also determined at this time.

When the production apparatus 100 operates the assembly operation, the robot control apparatus 202 outputs the imaging command in each of the scenes, through the communication line 210 in FIG. 2. The image processing apparatus 201 side previously keeps such a selection number of the antenna as to correspond to the imaging command, and the image processing apparatus 201 previously commands the camera 106 to change an antenna over an appropriate antenna in conjunction with each of the scenes, via the wireless station 112, through the serial control line 207.

Specifically, the robot control apparatus 202 outputs a command (imaging scene) intending to operate the robotic arm 101, which includes attitude information, to the image processing apparatus 201, before operating the robotic arm 101. The image processing apparatus 201 has a memory unit (SSD 820 in FIG. 6, for instance) which memorizes a table that associates the attitude information with the antenna to be selected. Here, the antenna portion 310 includes the transmitting antenna portion 311 and the receiving antenna portion 312, and accordingly the memory unit 820 memorizes the table concerning each of the transmitting antenna portion 311 and the receiving antenna portion 312 therein.

When the image processing apparatus 201 has acquired the command including the attitude information, the image processing apparatus selects a transmitting antenna to be connected to the transmitter 351 of the wireless unit 350, among the plurality of transmitting antennas 321 to 328, based on the table. Similarly, the image processing apparatus 201 selects a receiving antenna to be connected to the receiver 352 of the wireless unit 350, among the plurality of receiving antennas 331 to 338, based on the table. The image processing apparatus 201 outputs the information (antenna number, for instance) on these antennas to be changed over, to the wireless station 112 through the serial control line 207, as the serial control signal.

The transmitter 451 of the wireless unit 450 in the wireless station 112 makes the transmitting antenna 411 of the antenna portion 410 emit a serial control signal as an RF signal. The receiver 352 of the wireless unit 350 in the wireless station 111 receives the RF signal through the receiving antenna portion 312 of the antenna portion 310.

The receiver 352 of the wireless unit 350 returns the RF signal to the serial control signal, and outputs the serial control signal to the microcomputer 344.

The microcomputer 344 outputs a changeover signal to switcher circuits 361 and 362 in the wireless station 111, based on information (antenna number, for instance) on the transmitting antenna and the receiving antenna that correspond to the attitude information, which is included in the serial control signal. The switcher circuits 361 and 362 change over the antenna to be connected to the wireless unit 350, among the plurality of antennas, in conjunction with the changeover signal (specifically, attitude information).

Thus, before an attitude of the robotic arm 101 is actually changed, each of the antenna portions 311 and 312 is changed over to the antenna corresponding to the attitude to be changed. Specifically, the effective direction of the directional characteristic of each of the antenna portions 311 and 312 is changed. After the attitude of the robotic arm 101 has been changed, specifically, after the attitude has been changed to an attitude at which the imaging is performed by the image sensors 341 and 342, the effective characteristic area of each of the antenna portions 311 and 312 results in containing the antennas 411 and 412.

Thereby, the receiver 352 in the wireless station 111 can receive a next serial control signal and a next trigger signal from the transmitter 451 in the wireless station 112, and the transmitter 351 in the wireless station 111 can transmit an image signal to the receiver 452 in the wireless station 112.

The reason why the antenna has been previously changed over prior to the imaging is because the antenna is not changed over and the wireless communication is not maintained at all times while the robotic arm 101 is moving, but the wireless communication is performed at the time when the robotic arm 101 is stopped once, in each of the scenes.

Because of this, the antenna needs to be previously changed over to an appropriate antenna, in the next imaging scene of the camera 106. Otherwise, even the communication itself for changing over the antenna becomes enabled. In such a case, it is also possible for the wireless station 111 to firstly perform a searching operation for changing over the antenna, search for the appropriate antenna and perform communication.

In the present embodiment, the command for changing over the antenna in the wireless station 111 of the camera 106 is transmitted in the final communication out of the communication of the scene right before the changeover, and the operation of changing over the antenna is performed at this time. Because of this, the wireless station 111 does not need to previously perform the operation of searching for the antenna when the communication has been started, accordingly can perform communication for imaging at once, and does not produce lost time for securing the wireless communication. As a result, the above method is effective for shortening the tact time of the production apparatus.

Here, in general wireless communication, such a technique is known as to always search for the effective direction of the directional characteristic of the antenna toward a direction in which the radio waves are intense, and changes the effective direction of the directional characteristic. However, in the production apparatus, there is a property that a place at which the wireless communication is performed is specified after the production apparatus is once instructed and set up.

The production apparatus according to the present first embodiment changes the effective direction of the directional characteristic of the antenna portion 310 in conjunction with the operation of the robotic arm 101 so that the antenna portion 410 is included in the effective characteristic area of the antenna portion 310, by the transmitting side switcher circuit 361 and the receiving side switcher circuit 362. Accordingly, because the effective direction of the directional characteristic of the antenna portion 310 is changed in conjunction with the operation of the robotic arm 101, the production apparatus does not need to search for the direction in which the electromagnetic waves are intense. Because of this, the loss of the time required for the search is eliminated, and the property of the real time wireless communication is kept, and the tact time of production is shortened.

In addition, as has been described above, in order to search for the direction and change the effective direction of the directional characteristic of the antenna, the wireless station in the transmitting side needs to always emit a signal such as a beacon. Because of this, a series of procedures become necessary for changing over the directional characteristic of the antenna, but when the effective direction of the directional characteristic in the wireless communication is controlled according to the movement of the robotic arm 101, as in the first embodiment, the above described beacon signal is unnecessary. Accordingly, there is also such a merit that the wireless system itself can be simplified.

In addition, the wireless station 112 is fixed to the top portion 122 of the frame body 105, accordingly the effective direction of the directional characteristic of the antenna portion 310 becomes an upper direction, and such an occurrence can be suppressed that a radio signal to be used in the production apparatus 100 interferes with a radio signal to be used in an adjacent production apparatus.

In addition, the camera 106 is a measuring instrument which measures a distance from an object, and accordingly the production apparatus can shorten the operation time of the wireless units 350 and 450 themselves, by limiting a timing of communication to the time for the imaging of each scene. As a result, heat generation in the wireless units 350 and 450 can be reduced and a width of temperature change can be reduced. Accordingly, the above method also shows an exceptional effect of enhancing a measurement accuracy.

Incidentally, in the first embodiment, a control method has been described which makes the image processing apparatus 201 previously keep the antenna number corresponding to a scene, and makes the robot control apparatus 202 instruct which scene is the present scene as the attitude information, to the image processing apparatus 201, but the control method is not limited to the above control method. In other words, the attitude information of the robotic arm 101, which is output by the robot control apparatus 202, includes all information that is associated with the attitude of the robotic arm 101, and may be, for instance, an angle information of each joint, and an information of the antenna number of the robotic arm 101 or the like. In addition, in the first embodiment, the robot control apparatus 202 may transmit the attitude information of the robotic arm 101 to the image processing apparatus 201, automatically calculate the corresponding antenna number from the attitude information, and change over the antenna. According to the above operation, such a merit is produced that when the robotic arm 101 is instructed, the antenna number does not need to be instructed together.

Second Embodiment

Figure 10:
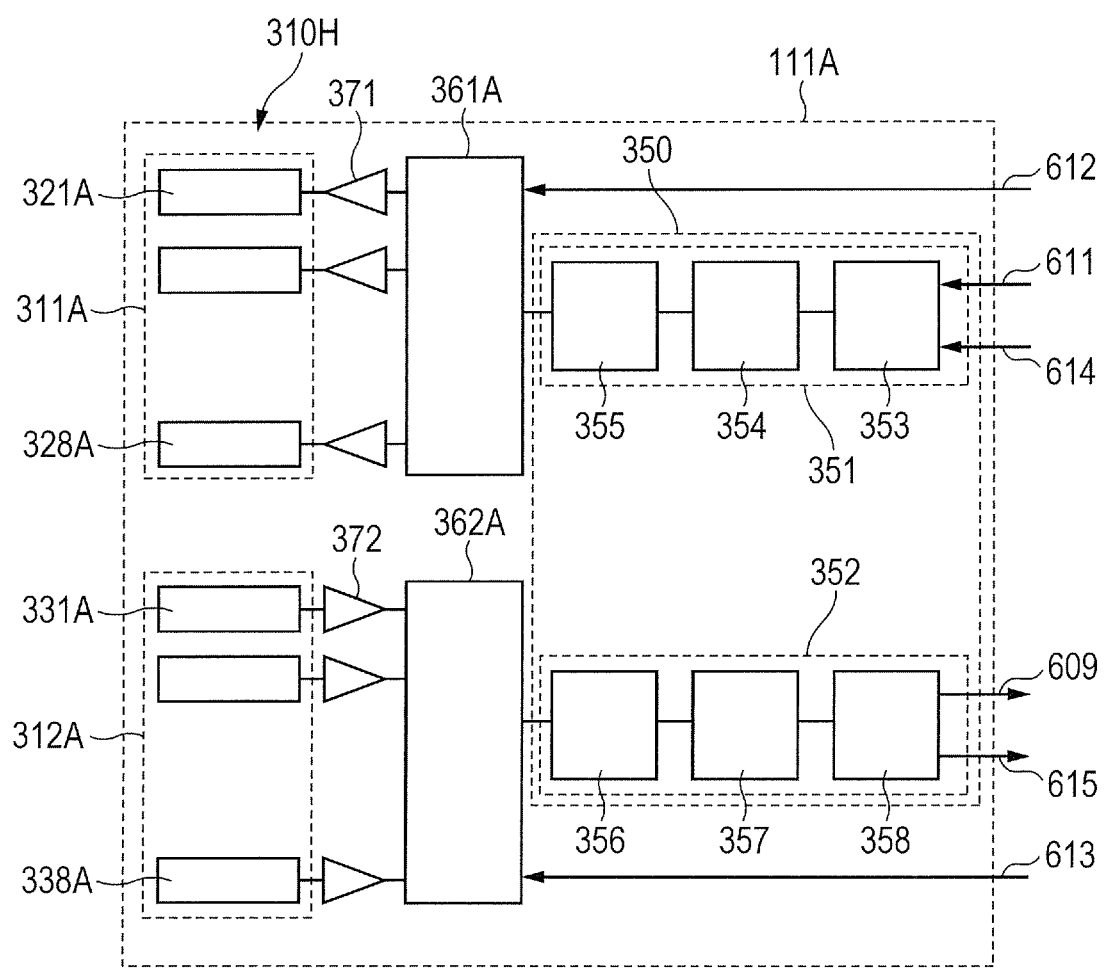
FIG. 10 is a block diagram illustrating a first wireless station of a production apparatus according to a second embodiment.

Next, a production apparatus according to a second embodiment of the present invention will be described. FIG. 10 is a block diagram illustrating a wireless station which an on-hand camera of the production apparatus according to the second embodiment has. Incidentally, configurations similar to those in the above described first embodiment are designated by the same reference characters and numerals, and the description will be omitted.

As is illustrated in FIG. 10, a wireless station 111A built into the on-hand camera supported by the robotic arm has an antenna portion 310A which functions as a first antenna portion, and phase changers 361A and 362A which function as a first changing unit. In addition, the wireless station 111A has the wireless unit 350, the driver circuit 371 and the LNA circuit 372 which function as the first wireless unit, similarly to the above described first embodiment.

An antenna portion 310A has a transmitting antenna portion 311A and a receiving antenna portion 312A. The transmitting antenna portion 311A is a phased-array antenna which has a plurality of transmitting antenna elements 321A to 328A, and of which the effective direction of the directional characteristic is changed in conjunction with a phase of an electromagnetic wave to be input to each of the transmitting antenna elements 321A to 328A. The receiving antenna portion 312A is a phased-array antenna which has a plurality of receiving antenna elements 331A to 338A, and of which the effective direction of the directional characteristic is changed in conjunction with a phase of an electromagnetic wave to be input to each of the receiving antenna elements 331A to 338A.

A phase changer 361A changes the phase of the electromagnetic wave in each of the transmitting antenna elements 321A to 328A in conjunction with the signal (attitude information) which has been input from the control line 612. In addition, a phase changer 362A changes the phase of the electromagnetic wave in each of the receiving antenna elements 331A to 338A in conjunction with the signal (attitude information) which has been input from the control line 613.

Even when the antenna portion 310A is the phased-array antenna as in the above described present second embodiment, the effective direction of the directional characteristic of the antenna portion 310A can be changed, similarly to the above described first embodiment. Because of this, the interference with the electromagnetic waves of other production apparatuses can be suppressed, and the tact time of production is shortened because the production apparatus does not need to search for the direction in which the electromagnetic waves are intense.

Third Embodiment

Figure 11:
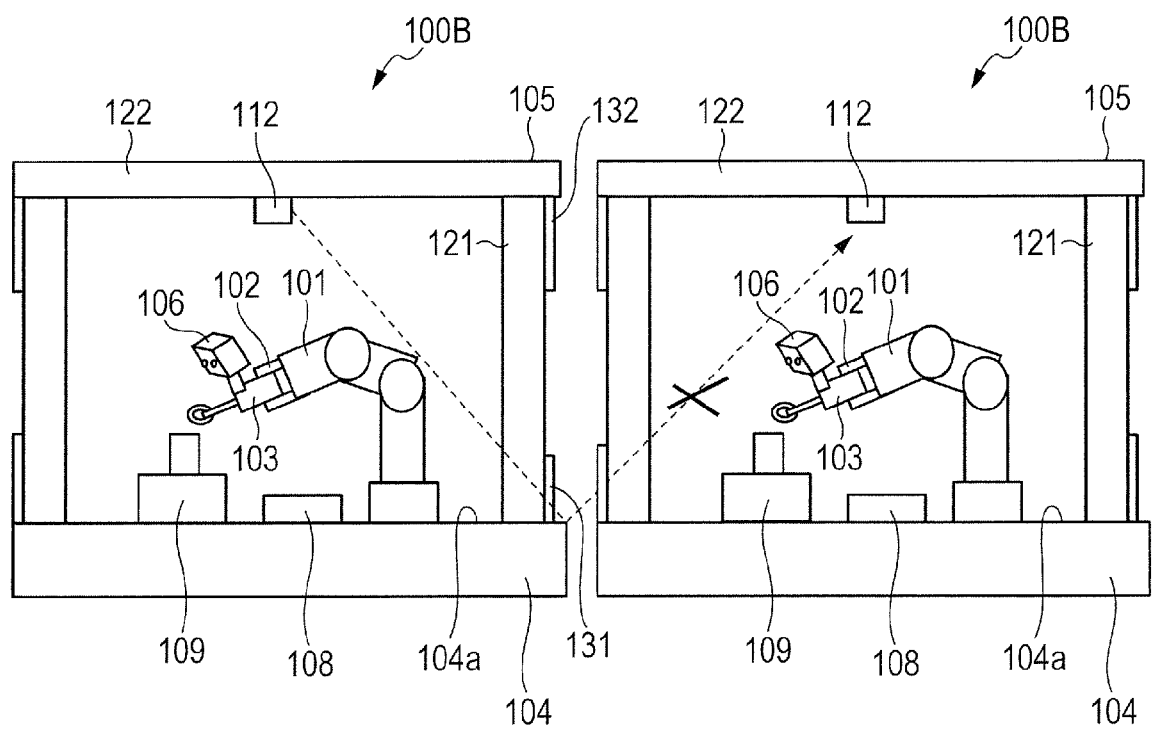
FIG. 11 is an explanatory view illustrating the state in which two production apparatuses according to a third embodiment are placed side by side.

Next, a production apparatus according to a third embodiment of the present invention will be described. FIG. 11 is an explanatory view illustrating the state in which two production apparatuses according to the third embodiment are placed side by side. Incidentally, configurations similar to those in the above described first and second embodiments are designated by the same reference characters and numerals, and the description will be omitted.

Generally, in the production apparatus such as a robot cell, which is provided with a robotic arm, a camera and lighting are provided over the robotic arm. In addition, a light-shielding plate is provided in order to shield the lighting of the ceiling.

Because of this, a production apparatus 100B of the present third embodiment is provided with the frame body 105 having a frame structure, similarly to the above described first embodiment. The frame body 105 may be formed of a frame only if only the camera and the illumination are attached thereto, and even when the light-shielding plate is further needed, the light-shielding plate does not need to be formed from metal. Accordingly, a metal portion finally may be only a frame. For this reason, it can be said that there are extremely few elements which reflect radio waves and light (in other words, electromagnetic wave), in the top portion 122 of the frame body 105.

On the other hand, as for the working access platform 104, the robotic arm 101 needs to strongly fixed thereto, and positions at which the component tray 108 and the workpiece mounting table 109 are fixed are required to have each an accuracy of a relative position with the robotic arm 101. Accordingly, the working access platform 104 is generally formed of a metallic member.

For this reason, when electromagnetic waves are transmitted to the wireless station 112 from the on-hand camera 106 toward an upper direction, there is almost no reflective element, but on the contrary, when the electromagnetic waves are transmitted toward a lower direction, as in the case of being transmitted to the camera 106 from the wireless station 112, there is a possibility that the electromagnetic waves are reflected by the working access platform 104.

However, the wireless station 112 has a predetermined directional angle, and accordingly when the production apparatuses are sufficiently separated from each other, reflected waves do not directly enter into the antenna of the adjacent production apparatus. Accordingly, no problem occurs.

However, when the production apparatuses 100B are placed side by side closely, the reflected wave of the transmitted radio wave from the wireless station 112 enters also into the wireless station 112 of the adjacent production apparatus 100B and becomes a disturbing wave, and a possibility of causing interference increases.

In the third embodiment, the production apparatus 100B is arranged in the frame body 105, and is provided with shielding plates 131 and 132 which shield the radio signal from being emitted to the outside of the frame body 105.

The shielding plate 131 is provided in a form of being fixed to a strut member 121 of the frame body 105. This shielding plate 131 is arranged in a position through which a radio wave does not interfere with the operating robotic arm 101, for instance, when the workpiece is delivered between mutually adjacent production apparatuses 100B and 100B, and in the third embodiment, is arranged on the lower end of the strut member 121 of the frame body 105. In other words, the shielding plate 131 is arranged in the lower part than a region in which the workpiece is delivered by the robotic arm 101.

Thereby, even though the electromagnetic wave (radio signal) which is emitted from the wireless station 112 is reflected by the working access platform 104, the reflected wave is shielded by the shielding plate 131, and the interference of the electromagnetic wave can be more effectively suppressed.

In addition, the shielding plate 132 is provided in a form of being fixed to the strut member 121 of the frame body 105. This shielding plate 132 is arranged in a position through which a radio wave does not interfere with the operating robotic arm 101, and in the third embodiment, is arranged on the upper end of the strut member 121 of the frame body 105. In other words, the shielding plate 132 is arranged in the upper part than a region in which the workpiece is delivered by the robotic arm 101.

Thereby, the electromagnetic wave (radio signal) which is emitted from the camera 106 is shielded by the shielding plate 132, and the interference of the electromagnetic wave can be more effectively suppressed.

Fourth Embodiment

Figure 12A:
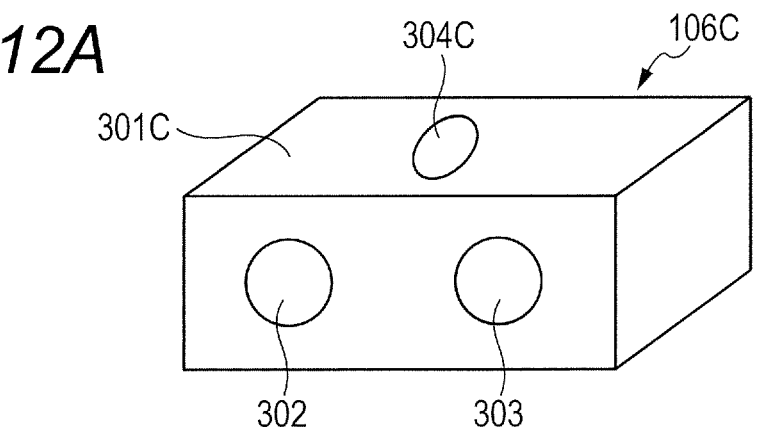
FIGS. 12A, 12B and 12C are explanatory views illustrating an on-hand camera of a production apparatus according to a fourth embodiment.
Figure 12B:
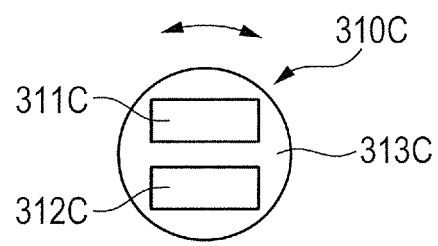
Figure 12C:
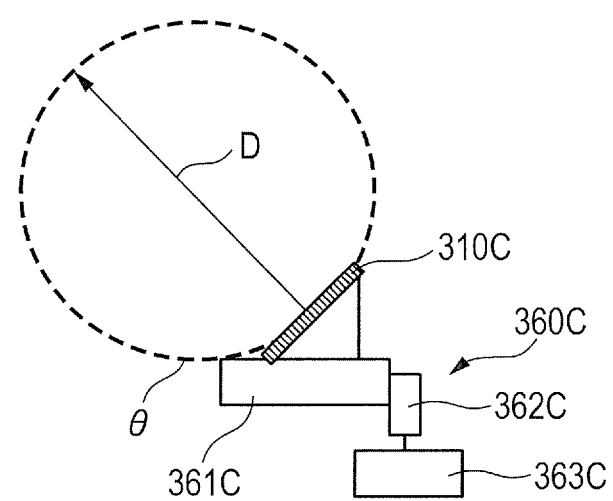

Next, a production apparatus according to a fourth embodiment of the present invention will be described. FIGS. 12A, 12B, and 12C are explanatory views illustrating an on-hand camera of a production apparatus according to the fourth embodiment. Incidentally, configurations similar to those in the above described first to third embodiments are designated by the same reference characters and numerals, and the description will be omitted.

FIG. 12A is a contour view of the on-hand camera; FIG. 12B is a top plan view of an antenna portion; and FIG. 12C is a side view of the antenna portion and a drive mechanism.

An on-hand camera 106C illustrated in FIG. 12A is provided with an antenna portion 310C which is illustrated in FIG. 12B and functions as a first antenna portion, and a housing 301C which accommodates the antenna portion 310C therein and has an aperture 304C that exposes the antenna portion 310C to the outside therethrough. The antenna portion 310C illustrated in FIG. 12B has: an insulating substrate 313C; and a transmitting antenna 311C that functions as a transmitting antenna portion, and a receiving antenna 312C that functions as a receiving antenna portion, which are arranged on the insulating substrate 313C. Each of the antennas 311C and 312C is a patch antenna.

As is illustrated in FIG. 12C, the on-hand camera 106C has a drive mechanism 360C which changes the attitude of the antenna portion 310C in conjunction with the attitude information of the robotic arm, as a first changing unit.

The drive mechanism 360C has a circular rotation table 361C which supports the antenna portion 310C as is illustrated in FIG. 12C and can move the antenna portion 310C in arrow directions in FIG. 12B. As is illustrated in FIG. 12C, the antenna portion 310C is installed so as to tilt by 45 degrees against a vertical direction. In addition, the drive mechanism 360C has a columnar friction wheel 362C which is pressure-contacted to the outer peripheral face of the rotation table 361C, and an ultrasonic motor 363C which rotates the friction wheel 362C.

This drive mechanism 360C can change the effective direction D of the directional characteristic of each of the antennas 311C and 312C of the antenna portion 310C, by rotating the rotation table 361C around the central axis of the rotation table 361C.

Figure 13:
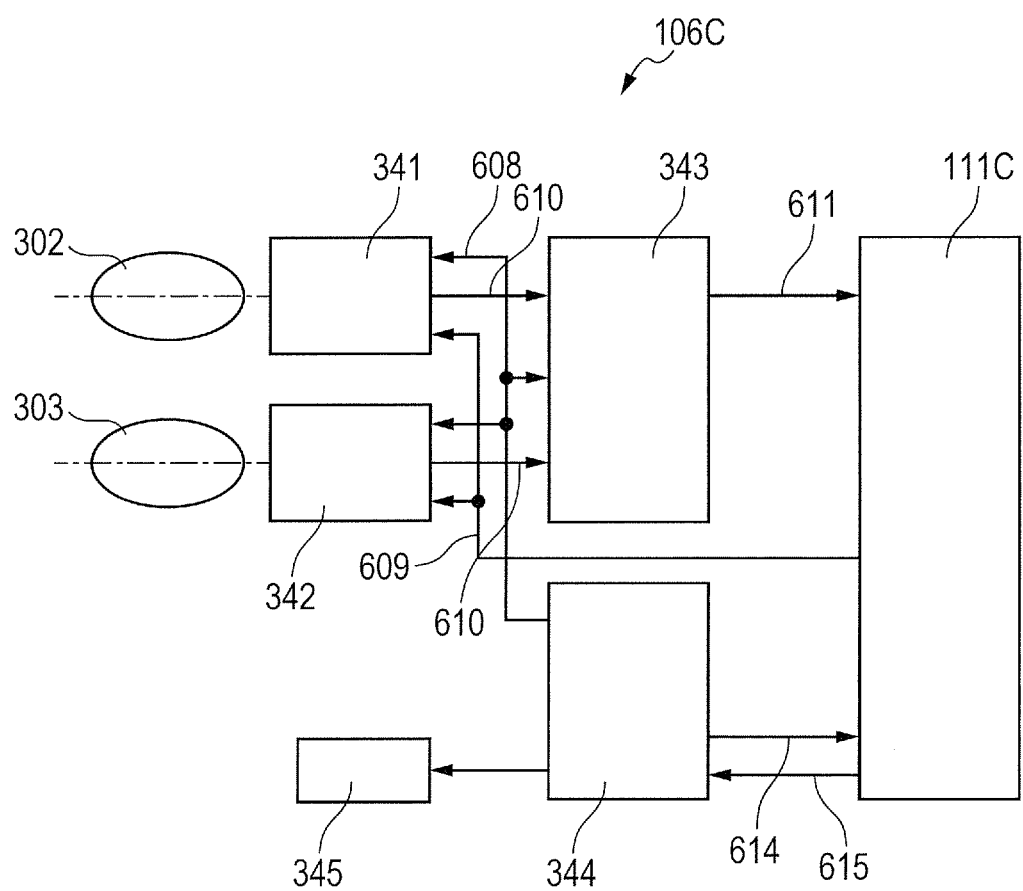
FIG. 13 is a block diagram illustrating a configuration of the on-hand camera in the fourth embodiment.

FIG. 13 is a block diagram illustrating a configuration of the camera 106C. The points at which the camera 106C is different from the camera 106 in the above described first embodiment are a point that a driving control circuit 345 for driving and controlling the ultrasonic motor 363C is connected to the microcomputer 344, and a point that a wireless station 111C has a different configuration. In other words, the camera 106C has the driving control circuit 345 for driving and controlling the ultrasonic motor 363C, and the wireless station 111C having a configuration different from that of the wireless station 111 in the above described first embodiment.

When the wireless station 111C of the camera 106C has received the command from the image processing apparatus through the wireless station 112, the driving control circuit 345 operates the ultrasonic motor 363C and rotates the antenna portion 310C. Thereby, the camera 106C changes the effective direction D of the directional characteristic of each of the antennas 311C and 312C of the antenna portion 310C to a direction that is as close to a direction as possible which is obtained by connecting the camera 106C with the wireless station 112.

Figure 14:
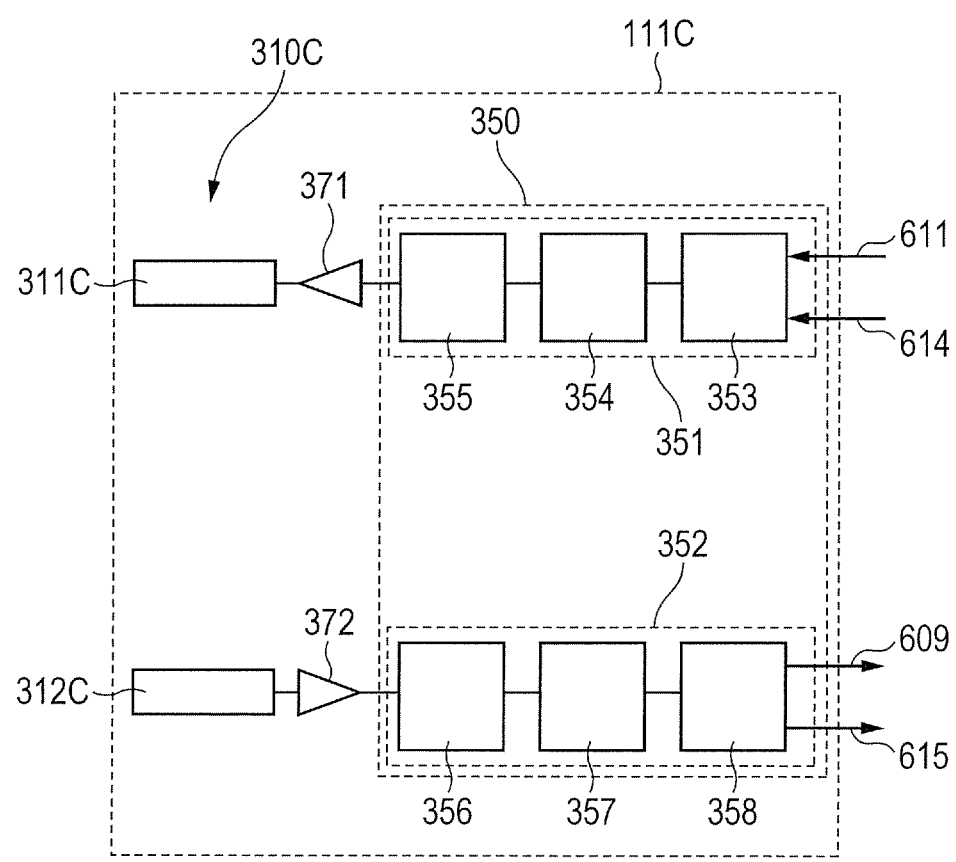
FIG. 14 is a block diagram illustrating a configuration of a first wireless station in the fourth embodiment.

FIG. 14 is a block diagram illustrating a configuration of the wireless station 111C. The wireless station 111C has: the above described antenna portion 310C; and a wireless unit 350, a driver circuit 371 and an LNA circuit 372 which have similar configurations to those in the above described first embodiment. In other words, the transmitting antenna and the receiving antennas are each one, accordingly the driver circuit 371 and the LNA circuit 372 are also each one, and the switcher circuit is omitted.

In the antenna portion 310C illustrated in FIG. 12B, the antennas 311C and 312C are rotationally driven, and accordingly have a wide directional angle θ as is illustrated in FIG. 12C. Because of this, it is not necessary to finely change the effective direction of the directional characteristic of the antennas 311C and 312C in conjunction with the attitude of the robotic arm, and accordingly there is a merit that the setting of the antenna in the instruction becomes easy. On the other hand, the directional angle θ is wide. Accordingly, the shielding plate 132 described in the above described third embodiment is arranged on the frame body 105, and thereby the interference of the electromagnetic waves with the adjacent production apparatuses is effectively prevented.

Fifth Embodiment

Figure 15A:
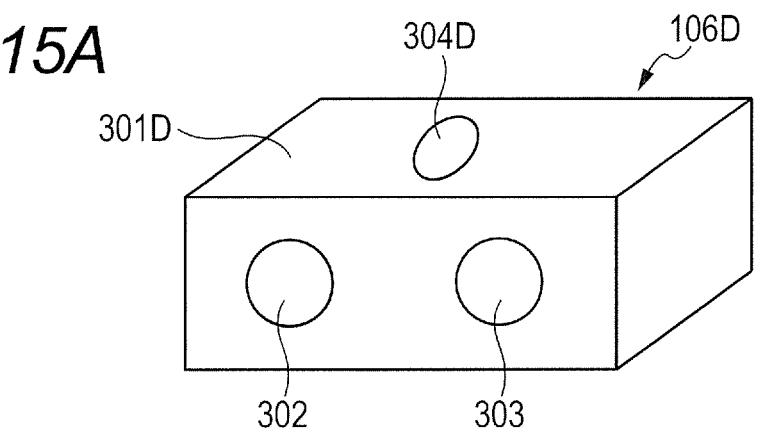
FIGS. 15A, 15B and 15C are explanatory views illustrating an on-hand camera of a production apparatus according to a fifth embodiment.
Figure 15B:
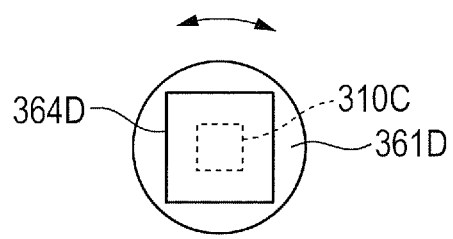
Figure 15C:
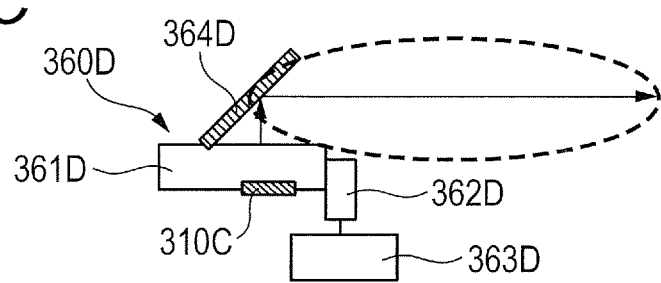

Next, a production apparatus according to a fifth embodiment of the present invention will be described. FIGS. 15A, 15B and 15C are explanatory views illustrating an on-hand camera of a production apparatus according to the fifth embodiment. Incidentally, configurations similar to those in the above described first to fourth embodiments are designated by the same reference characters and numerals, and the description will be omitted.

The on-hand camera 106C in the above described fourth embodiment has changed the effective direction of the directional characteristic of the antenna portion 310C toward a direction of the wireless station 112, by directly rotating the antenna portion 310C, but the effective direction of the directional characteristic of the antenna portion 310C may be indirectly changed.

FIG. 15A is a contour view of the on-hand camera; FIG. 15B is a top plan view illustrating one part of an antenna portion and a drive mechanism; and FIG. 15C is a side view of the antenna portion and the drive mechanism.

The on-hand camera 106D illustrated in FIG. 15A is provided with an antenna portion 310C which has a similar configuration to that in the above described fourth embodiment, and a housing 301D which accommodates the antenna portion 310C therein and has an aperture 304D that exposes the antenna portion 310C to the outside therethrough.

The camera 106D has a reflective plate 364D that is arranged in the effective direction of the directional characteristic of the antenna portion 310C, and a drive mechanism 360D that changes the attitude of the reflective plate 364D in conjunction with the attitude information, as a first changing unit. The antenna portion 310C is fixed to a not-shown fixing portion.

The drive mechanism 360D has a rotating plate 361D to which the reflective plate 364D is fixed, a columnar friction wheel 362D which is pressure-contacted to the outer peripheral face of the rotating plate 361D, and an ultrasonic motor 363D which rotates the friction wheel 362D. The rotating plate 361D has a through hole for passing the radio wave emitted from the antenna portion 310C therethrough. The reflective plate 364D is arranged so as to tilt by 45 degrees against a face in an opposite side to a side in the rotating plate 361D, on which the antenna portion 310C is arranged.

The friction wheel 362D is rotated by the operation of the ultrasonic motor 363D, and thereby the rotating plate 361D is rotationally driven. Thereby, the direction of the reflective plate 364D is changed, and the effective direction of the directional characteristic of the antenna portion 310C is substantially changed. Thereby, the antenna portion 310C does not need to be moved, and accordingly it becomes unnecessary to move an electric signal such as a superhigh frequency signal which needs to be input to the antenna portion 310C, along the movable portion, by using a flexible member such as a flexible conduit. For this reason, there is such a merit that the cost and the size can be reduced.

Sixth Embodiment

Figure 16:
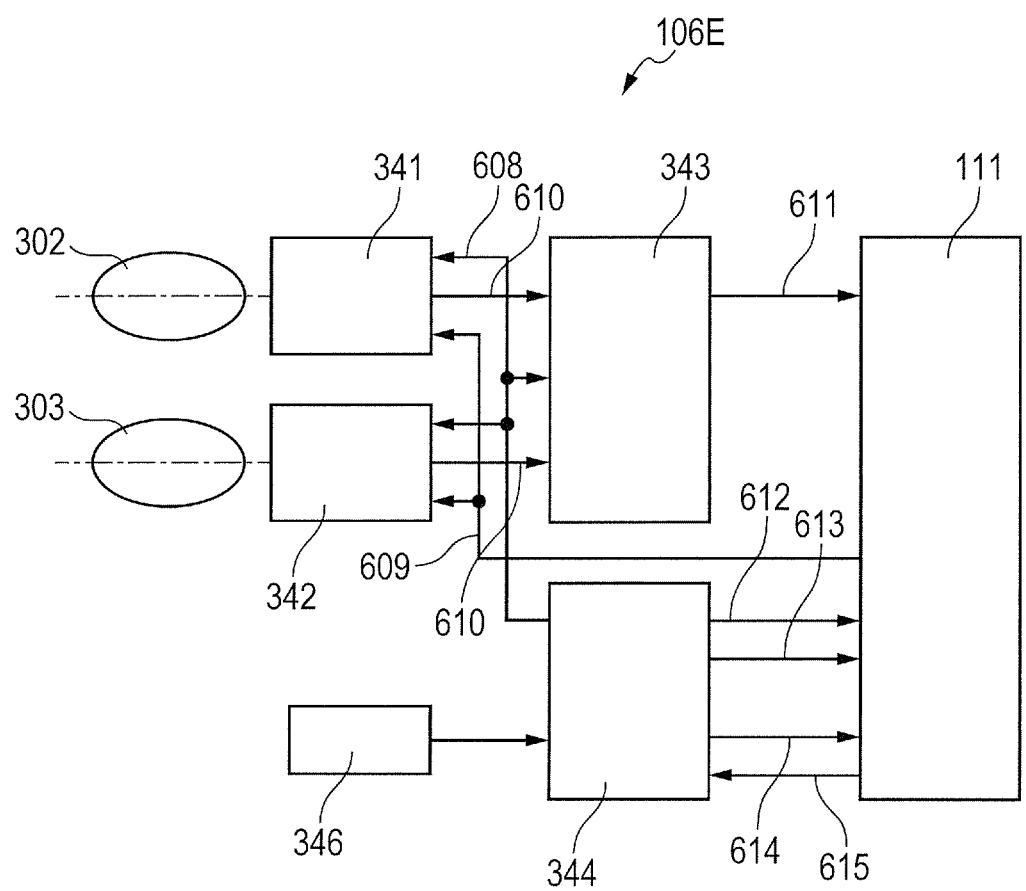
FIG. 16 is a block diagram illustrating an on-hand camera of a production apparatus according to a sixth embodiment.

Next, a production apparatus according to a sixth embodiment of the present invention will be described. FIG. 16 is a block diagram illustrating an on-hand camera of a production apparatus according to the sixth embodiment. Incidentally, configurations similar to those in the above described first to fifth embodiments are designated by the same reference characters and numerals, and the description will be omitted.

The on-hand camera 106E in the sixth embodiment is further provided with an attitude detecting unit 346 which is connected to the microcomputer 344 in the on-hand camera 106 in the above described first embodiment. The attitude detecting unit 346 is, for instance, a sensor which can detect the attitude. The attitude detecting unit 346 is a unit for detecting the attitude of the robotic arm 101 (FIGS. 1A and 1B), and is attached to the on-hand camera 106E, the tool 103, the robot hand 102 or the robotic arm 101.

In the sixth embodiment, the microcomputer 344 acquires the attitude information of the robotic arm 101 not from the image processing apparatus but from the attitude detecting unit 346. The antenna is changed over with the use of the switcher circuit, similarly to the above described first embodiment.

Thereby, the microcomputer controls the effective direction of the directional characteristic of the antenna portion in the wireless station 111 built into the on-hand camera 106E so as to head for the wireless station 112 (FIGS. 1A and 1B) according to the movement of the robotic arm.

According to the sixth embodiment, the selection number of the antenna does not need to be instructed so as to correspond to the imaging scene in the prior instruction stage. Accordingly, there is an effect of shortening a setup time period of the production apparatus.

Incidentally, in the sixth embodiment, the antenna is configured to be changed over with the use of the attitude information sent from the attitude detecting unit 346, but the attitude information sent from the attitude detecting unit 346 may be used when the attitude of the antenna is changed, as in the above described fourth and fifth embodiments.

In addition, in the sixth embodiment, the antenna portion 310C itself has been moved from the change of the captured attitude of the on-hand camera, with the use of the attitude detecting unit 346, but the reflective plate may be configured so as to be moved with the use of the attitude detecting unit 346. It is also possible by using this operation to control the effective direction of the directional characteristic of the first antenna portion so as to always head for the upper direction.

Seventh Embodiment

Figure 17A:
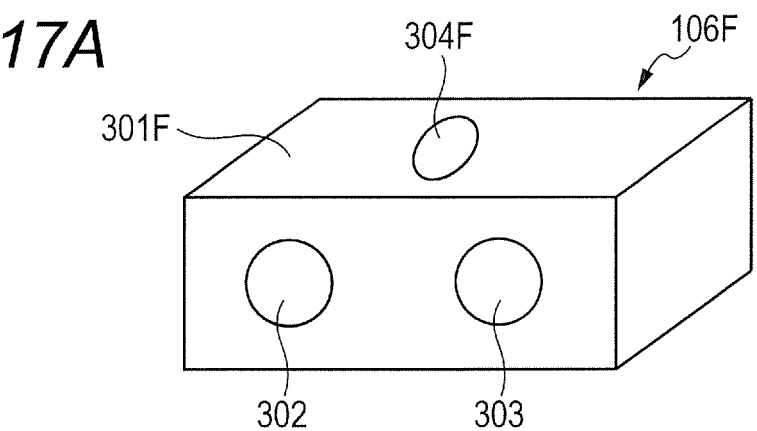
FIGS. 17A, 17B and 17C are explanatory views illustrating an on-hand camera of a production apparatus according to a seventh embodiment.
Figure 17B:
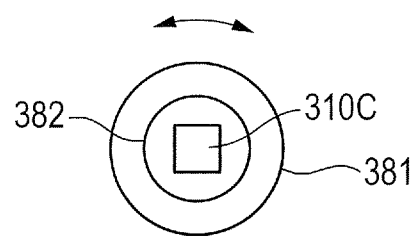
Figure 17C:
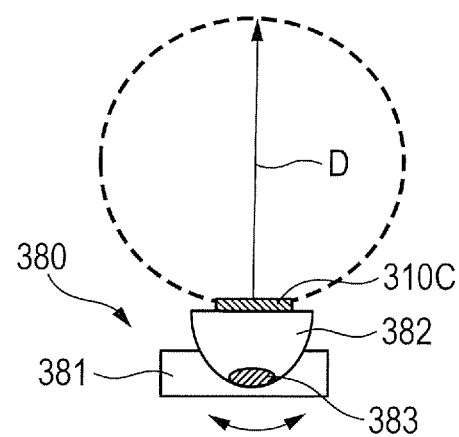

Next, a production apparatus according to a seventh embodiment of the present invention will be described. FIGS. 17A, 17B and 17C are explanatory views illustrating an on-hand camera of a production apparatus according to the seventh embodiment. Incidentally, configurations similar to those in the above described first to sixth embodiments are designated by the same reference characters and numerals, and the description will be omitted.

The production apparatus in the above described sixth embodiment has autonomously changed the effective direction of the directional characteristic of the antenna portion 310 in the wireless station 111 by making the microcomputer 344 read the attitude information sent by the attitude detecting unit 346. If the size of the antenna portion is small, such a mechanism may be provided as to directly make a radio chip always head for an upper face direction with the use of a weight. The configuration also similarly shows an effect of shortening a setup time period of the production apparatus.

FIG. 17A is a contour view of the on-hand camera; FIG. 17B is a top plan view illustrating the antenna portion and an attitude keeping mechanism; and FIG. 17C is a side view of the antenna portion and the attitude keeping mechanism. The on-hand camera 106F illustrated in FIG. 17A is provided with an antenna portion 310C which has a similar configuration to that in the above described fourth embodiment, and a housing 301F which accommodates the antenna portion 310C therein and has an aperture 304F that exposes the antenna portion 310C to the outside therethrough.

The camera 106F has the attitude keeping mechanism 380 which keeps the antenna portion 310C at a predetermined attitude, regardless of the attitude of the robotic arm 101 (FIGS. 1A and 1B), as a first changing unit. In FIG. 17C, the effective direction D of the directional characteristic of each of the antennas in the antenna portion 310C is illustrated.

The attitude keeping mechanism 380 has: a housing 381 which has the antenna portion 310C mounted thereon and is movable to the arrow directions in FIG. 17B; a housing 382 which is supported by the housing 381 and is movable to the arrow directions in FIG. 17C; and a weight 383 which is mounted on the housing 382. The attitude keeping mechanism 380 is configured so that when the attitude of the on-hand camera 106F (in other words, robotic arm 101) changes, the housings 381 and 382 move three axially due to the influence of gravity, and the effective direction D of the directional characteristic of the antenna portion 310C heads for an opposite direction (specifically, upper direction) to the gravity.

Due to the above configuration, the effective direction D of the directional characteristic of the antenna portion 310C of the on-hand camera 106F always heads for the upper direction in conjunction with the attitude of the robotic arm 101. Because of this, it becomes unnecessary to control the movement of the antenna portion and change over the antenna among the plurality of antennas in conjunction with the attitude information of the robotic arm 101. Thus, the attitude of the antenna portion 310C can be changed with a simple configuration.

In addition, in the seventh embodiment, the effective direction of the directional characteristic of the antenna portion 310C has been configured so as to directly head for the upper direction, but the configuration is not limited to the upper direction. The effective direction of the directional characteristic of the antenna portion 310C may also be configured so as to head for the upper direction through a reflective plate. In addition, the effective direction of the directional characteristic of the antenna portion 310C is not limited to the upper direction, as long as the antenna portion 310C can communicate with the wireless station 112.

Eighth Embodiment

Figure 18A:
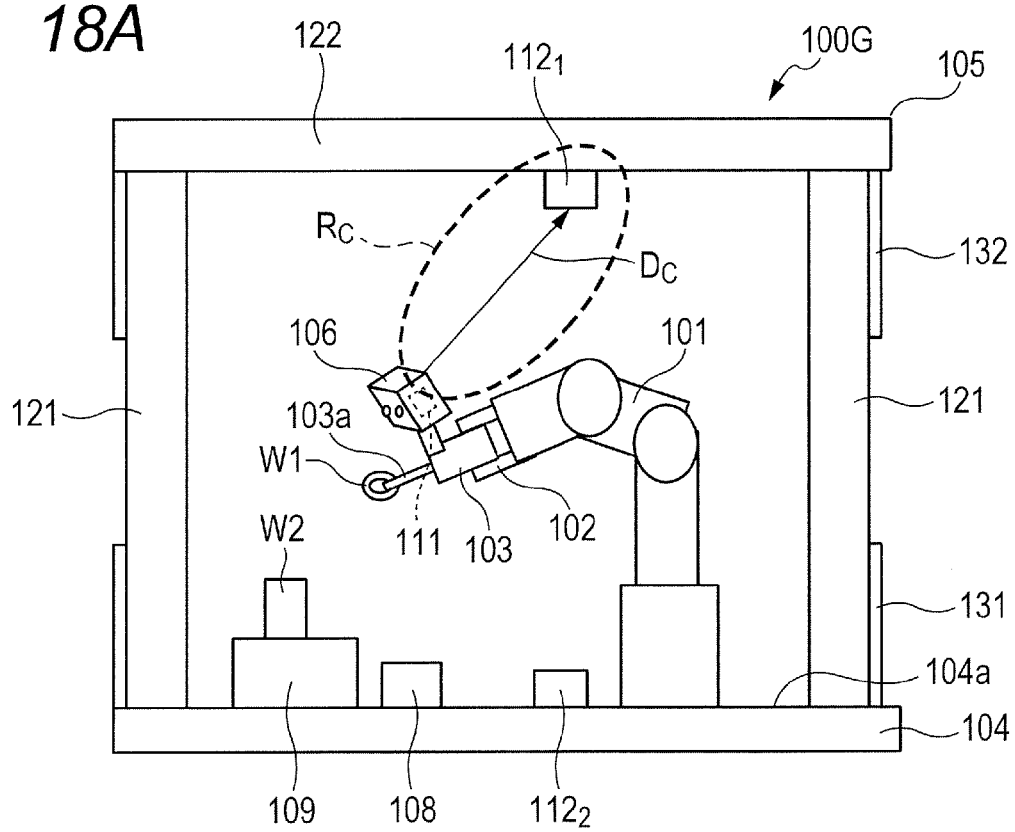
FIGS. 18A and 18B are explanatory views illustrating a schematic configuration of a production apparatus according to an eighth embodiment.
Figure 18B:
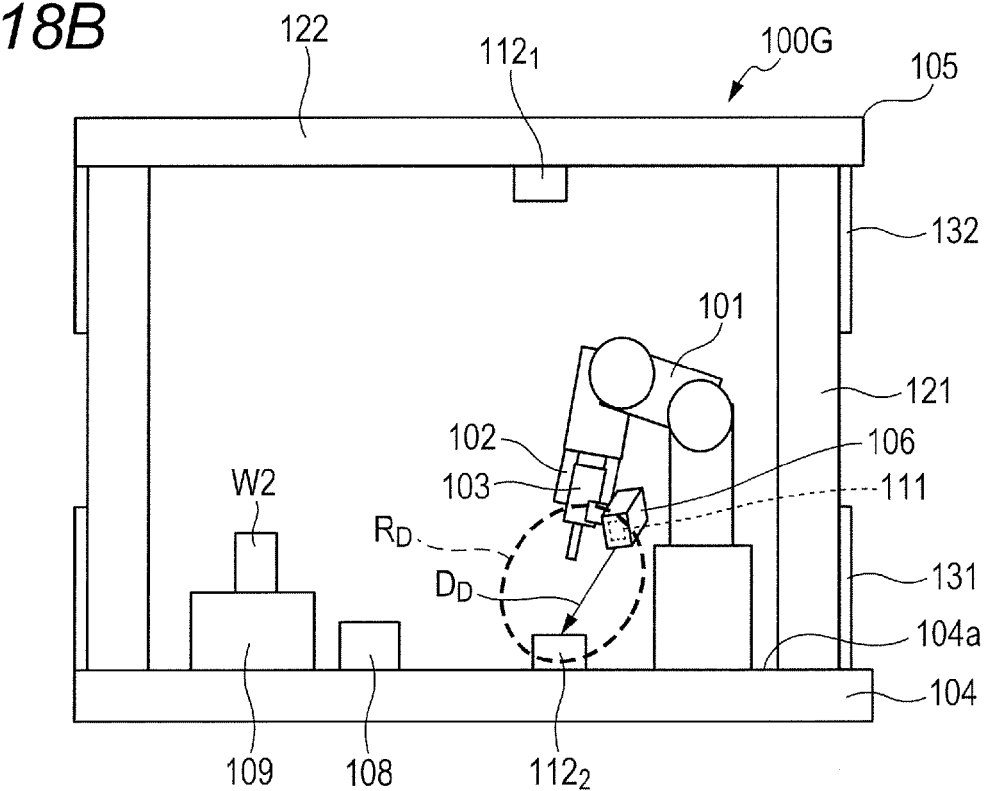

Next, a production apparatus according to an eighth embodiment of the present invention will be described. FIGS. 18A and 18B are explanatory views illustrating a schematic configuration of a production apparatus according to the eighth embodiment of the present invention. FIG. 18A and FIG. 18B are explanatory views each illustrating the schematic configuration of the production apparatus, but attitudes (imaging scenes) of robotic arms 101 at the time when an acquired image is transmitted are different from each other. Incidentally, configurations similar to those in the above described first to seventh embodiments are designated by the same reference characters and numerals, and the description will be omitted.

In the above described first to seventh embodiments, the case has been described where the production apparatus is provided with one wireless station 112, but in the eighth embodiment, the case will be described where the production apparatus is provided with a plurality of wireless stations 112.

The production apparatus 100G in the eighth embodiment is provided with a plurality (for instance, two) of wireless stations $112_1$ and $112_2$ which have each a similar configuration to that of the wireless station 112 in the above described first embodiment and are arranged at an interval, but other parts of the configuration are approximately similar to the production apparatus 100 of the above described first embodiment.

The wireless station $112_1$ is supported by the top portion 122 of the frame body 105, and the wireless station $112_2$ is supported by the working surface 104a of the working access platform 104.

Incidentally, an arrow $D_C$ and an arrow $D_D$ in FIG. 18A and FIG. 18B show the effective directions of the directional characteristics of the transmitting antenna portion 311 and the receiving antenna portion 312 (FIGS. 3A, 3B and 3C) of the antenna portion 310 in the wireless station 111, respectively. In addition, dashed lines $R_C$ and $R_D$ in FIG. 18A and FIG. 18B show the directional characteristics of the above antenna portions, respectively.

Figure 19:
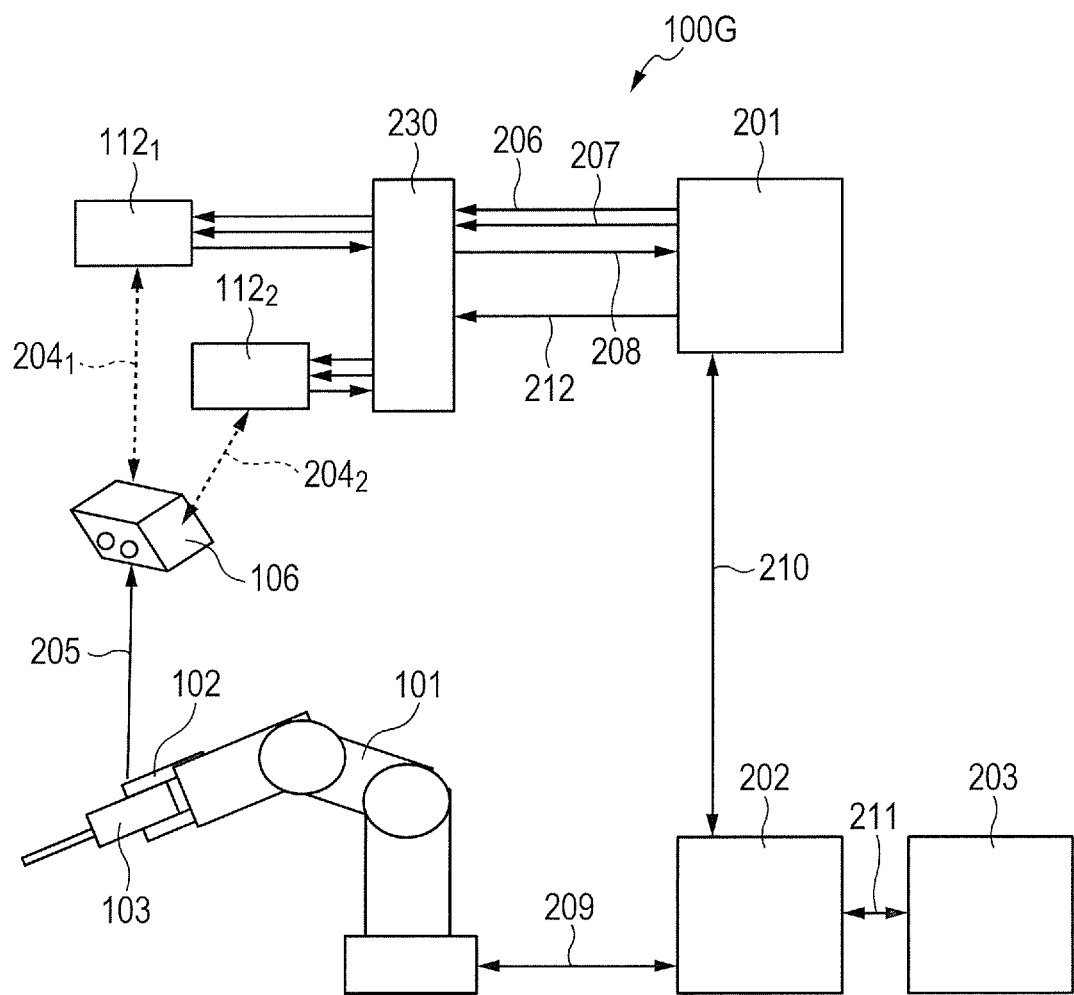
FIG. 19 is a block diagram illustrating a configuration of the production apparatus according to the eighth embodiment.

FIG. 19 is a block diagram illustrating a configuration of the production apparatus according to the eighth embodiment of the present invention. The wireless stations $112_1$ and $112_2$ are connected to the image processing apparatus 201 through a selector 230. The wireless stations $112_1$ and $112_2$ are connected to the wireless station 111 built into the camera 106 through wireless paths $204_1$ and $204_2$, respectively.

Similarly to the above described first embodiment, the transmitting antennas of the transmitting antenna portion 311 and the receiving antennas of the receiving antenna portion 312 of the antenna portion 310 (FIGS. 3A, 3B and 3C) in the wireless station 111 are previously changed over in conjunction with the imaging scenes of the camera 106, respectively.

Furthermore, in the present eighth embodiment, the selector 230 is changed over by a control line 212, and selects the wireless station $112_1$ or the wireless station $112_2$, which is to be connected to the image processing apparatus 201, and connects the selected station with the image processing apparatus 201. Thereby, in each of the scenes, the wireless station $112_1$ or the wireless station $112_2$, which is to be connected to the image processing apparatus 201, is appropriately connected.

In the above described present eighth embodiment, there is such a merit that even in the scene in which the robotic arm 101 itself shields the upper part of the camera 106 as is illustrated in FIG. 18B, the wireless communication can be adequately performed.

Incidentally, in FIGS. 18A and 18B, such an example has been shown that the plurality of wireless stations $112_1$ and $112_2$ are provided so as to correspond to the camera 106, in order to eliminate a dead angle of wireless communication as in the case where there is a large obstacle between the on-hand camera and the wireless unit in conjunction with the on-hand camera.

Figure 20A:
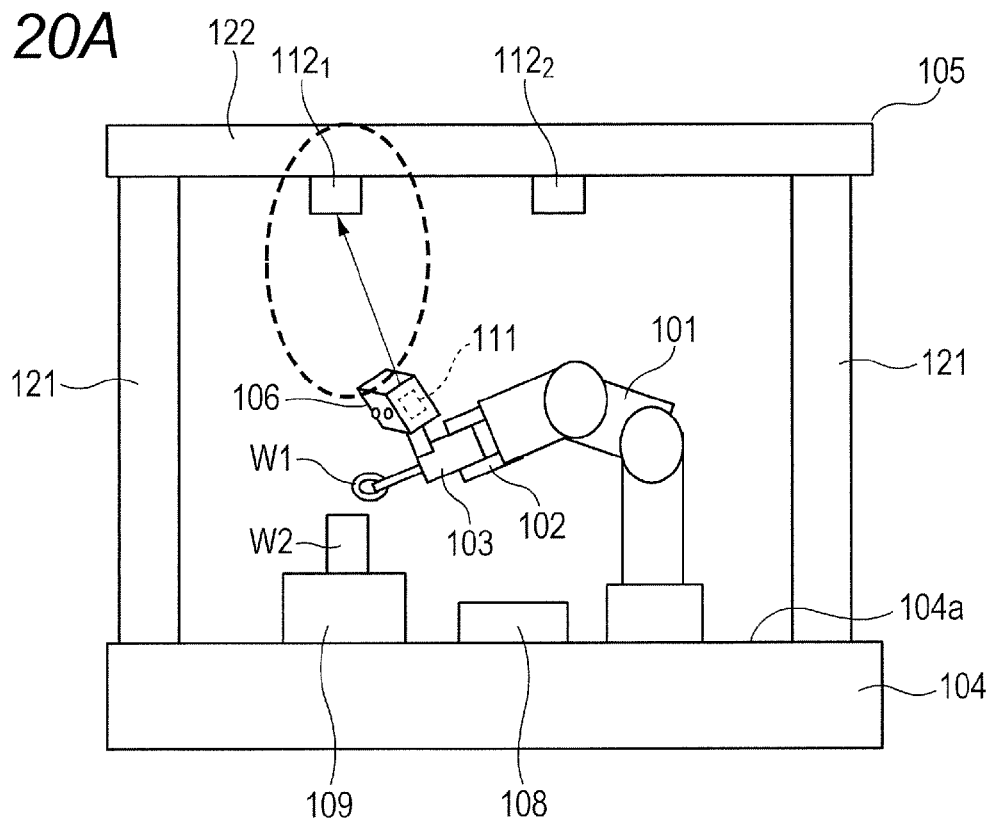
FIGS. 20A and 20B are explanatory views illustrating a modified example of the production apparatus according to the eighth embodiment.
Figure 20B:
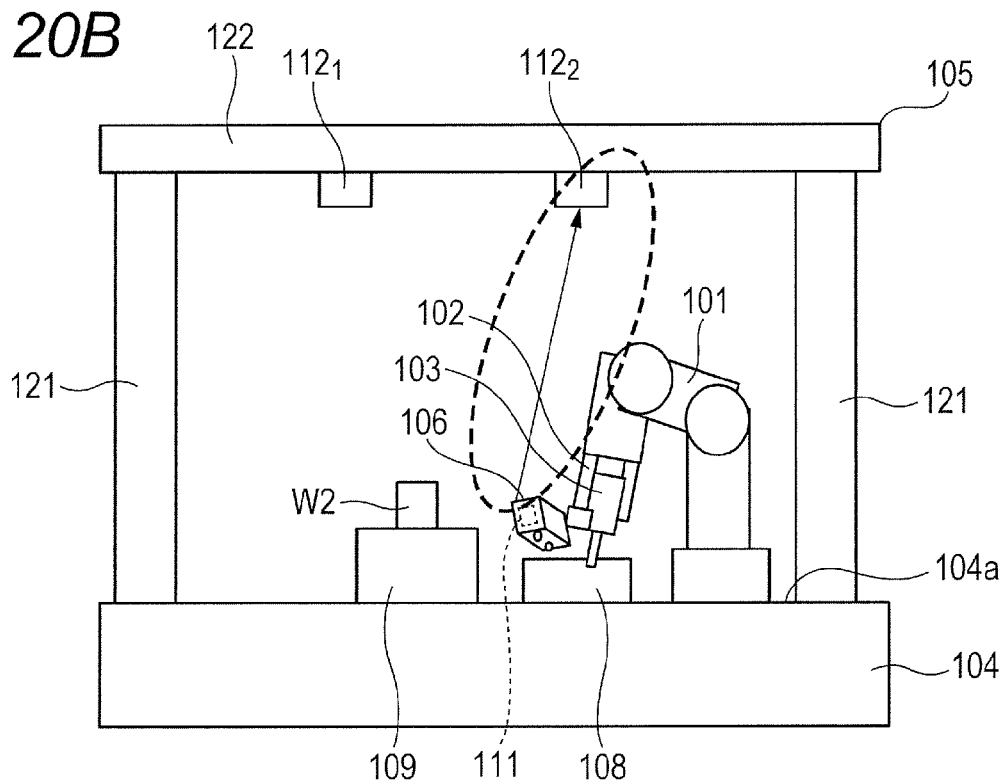

Furthermore, there is also a use of narrowing the directional angles of the antennas in the wireless stations $112_1$ and $112_2$ to prevent radio interference, as a modified example of the present eighth embodiment. For instance, FIGS. 20A and 20B are explanatory views illustrating a modified example of the production apparatus according to the eighth embodiment of the present invention. FIG. 20A and FIG. 20B are explanatory views each illustrating the schematic configuration of the production apparatus, but attitudes (imaging scenes) of robotic arms 101 at the time when an acquired image is transmitted are different from each other.

The wireless stations $112_1$ and $112_2$ are supported by the top portion 122 of the frame body 105. Thus, the plurality of wireless stations $112_1$ and $112_2$ are provided on the top portion 122, and thereby the directional angle of each of the wireless stations $112_1$ and $112_2$ can be narrowed, respectively. As a result, few reflected radio waves directly enter into the more adjacent production apparatus, and the influence of the radio interference caused by the reflection can be reduced.

Incidentally, the case is also acceptable where each of the wireless stations $112_1$ and $112_2$ is supported by the working surface 104a of the working access platform 104.

Ninth Embodiment

Figure 21:
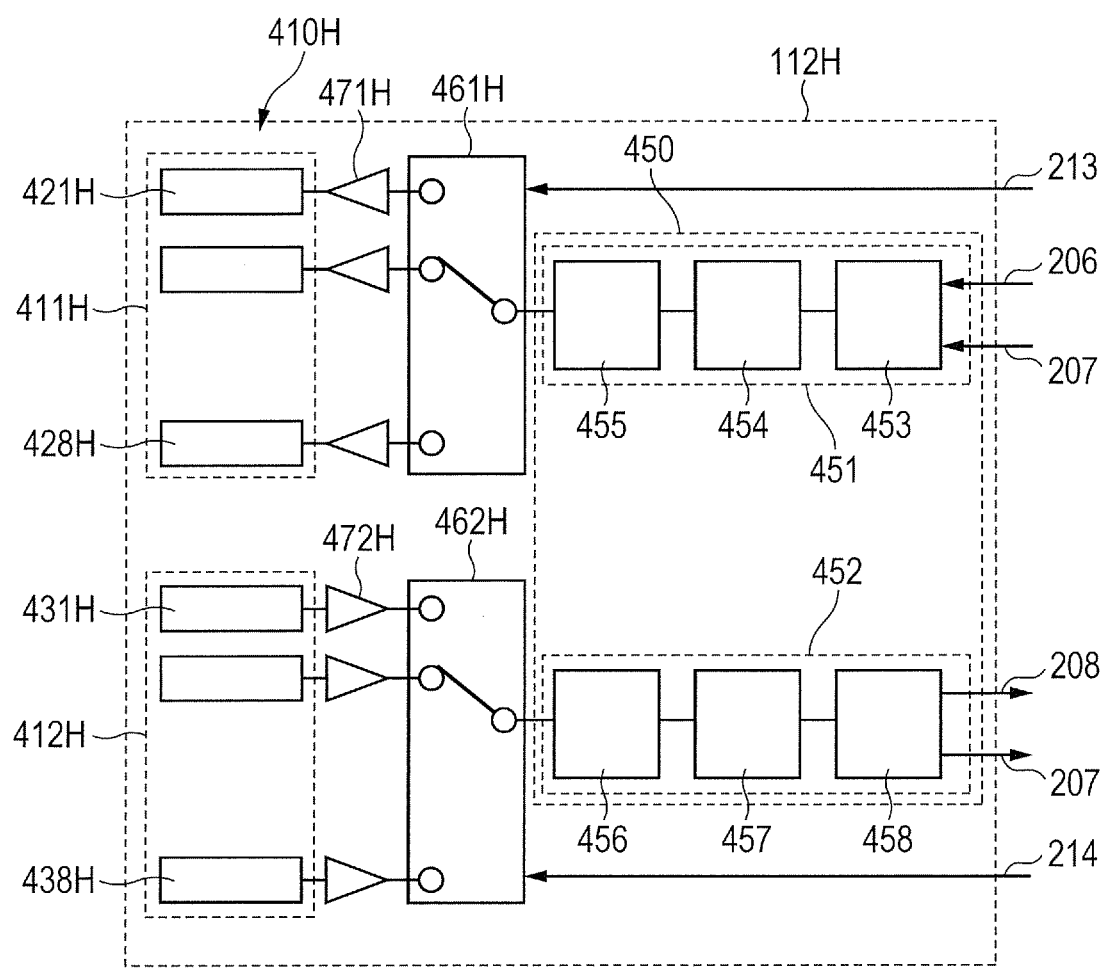
FIG. 21 is a block diagram illustrating a second wireless station of a production apparatus according to a ninth embodiment.

Next, a production apparatus according to a ninth embodiment of the present invention will be described. FIG. 21 is a block diagram illustrating a second wireless station of a production apparatus according to the ninth embodiment. Incidentally, configurations similar to those in the above described first to eighth embodiments are designated by the same reference characters and numerals, and the description will be omitted.

In the above described first to eighth embodiments, the case has been described where the effective direction of the directional characteristic of the second antenna portion in the second wireless station is fixed which is provided on the frame body or the working access platform, but in the above described first to eight embodiments, the effective direction of the directional characteristic of the second antenna portion in the second wireless station may also be changed.

A wireless station 112H which is a second wireless station of the production apparatus of the ninth embodiment is provided with an antenna portion 410H which is the second antenna portion, and a wireless unit 450 that is a second wireless unit connected to the antenna portion 410H and has a similar configuration to that in the above described first embodiment. The antenna portion 410H has a transmitting antenna portion 411H which functions as a second transmitting antenna portion, and a receiving antenna portion 412H which functions as a second receiving antenna portion.

The transmitting antenna portion 411H has transmitting antennas 421H to 428H which are a plurality of second transmitting antennas, and receiving antennas 431H to 438H which are a plurality of second receiving antennas. Each of the antennas 421H to 428H and 431H to 438H is an antenna having a directional characteristic, and is a patch antenna, for instance. In addition, the transmitting antennas 421H to 428H are arranged so as to have a different effective direction of the directional characteristic from each other, and the receiving antennas 431H to 438H are arranged so as to have a different effective direction of the directional characteristic from each other.

In addition, the wireless station 112H has a transmitting side switcher circuit 461H and a receiving side switcher circuit 462H, as a second changing unit.

A driver circuit 471H is connected between each of the terminals of the transmitting side switcher circuit 461H and each of the transmitting antennas 421H to 428H. In addition, an LNA circuit 472H is connected between each of the terminals of the receiving side switcher circuit 462H and each of the receiving antennas 431H to 438H.

The transmitting side switcher circuit 461H connects one transmitting antenna among the plurality of transmitting antennas 421H to 428H, with the transmitter 451, in conjunction with a changeover signal which has been input from the image processing apparatus through a control line 213. Specifically, the transmitting side switcher circuit 461H changes over a transmitting antenna to be connected to the transmitter 451 through a driver circuit 471, in conjunction with the changeover signal. Thereby, the switcher circuit 461H receives the changeover signal which is transmitted from the image processing apparatus through the control line 213, changes over a transmitting antenna to be connected to the transmitter 451 in conjunction with the changeover signal, and changes an effective direction of the directional characteristic of the transmitting antenna portion 411H.

The receiving side switcher circuit 462H connects one receiving antenna among the plurality of receiving antennas 431H to 438H, with the receiver 452, in conjunction with a changeover signal which has been input from the image processing apparatus through a control line 214. Specifically, the receiving side switcher circuit 462H changes over the receiving antenna to be connected to the receiver 452 through the LNA circuit 472H, in conjunction with the changeover signal. Thereby, the switcher circuit 462H receives the changeover signal which is transmitted from the image processing apparatus through the control line 214, changes over the receiving antenna to be connected to the receiver 452 in conjunction with the changeover signal, and changes an effective direction of the directional characteristic of the receiving antenna portion 412H.

As has been described above, the switcher circuits 461H and 462H which are the second changing unit change the effective direction of the directional characteristic of the antenna portion 410H in conjunction with the operation of the robotic arm 101 so that the first antenna portion in the wireless station 111 (FIGS. 1A and 1B) is included in the effective characteristic area of the antenna portion 410H.

Accordingly, each of the antennas 421H to 428H and 431H to 438H of the antenna portion 410H can be configured to be an antenna having a narrower directional angle. The production apparatus becomes enabled to prevent a reflected wave and the like, which leak from a more adjacent production apparatus, from being erroneously incident on itself, by changing over the antenna in conjunction with each of the scenes, by the control of the image processing apparatus side, and thereby to construct a wireless system therein which is more resistant to the radio interference.

Incidentally, the transmitting antenna portion 411H and the receiving antenna portion 412H may be each formed of a phased-array antenna, similarly to the above described second embodiment. In addition, the transmitting antenna portion 411H and the receiving antenna portion 412H may be each formed of one antenna, and the effective direction of the directional characteristic of the antenna may be changed by the drive mechanism which drives the attitude of the antenna, similarly to the above described fourth and fifth embodiments.

Tenth Embodiment

Figure 22A:
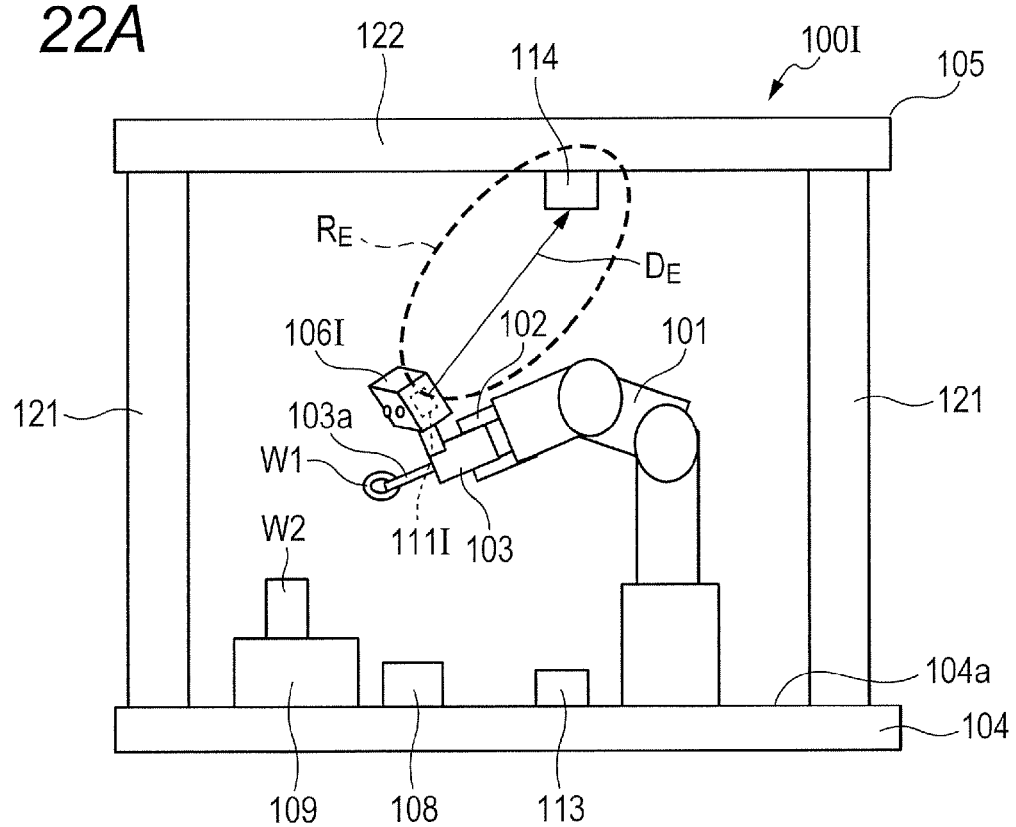
FIGS. 22A and 22B are explanatory views illustrating a schematic configuration of a production apparatus according to a tenth embodiment.
Figure 22B:
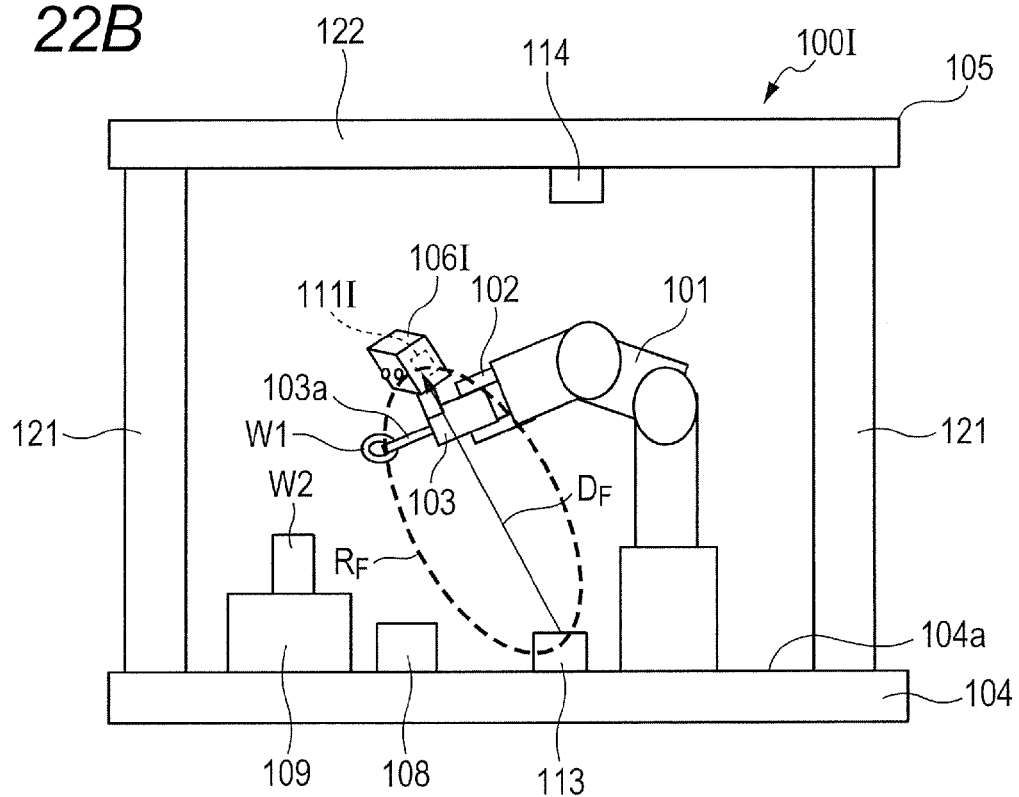

Next, a production apparatus according to a tenth embodiment of the present invention will be described. FIGS. 22A and 22B are explanatory views illustrating a schematic configuration of a production apparatus according to the tenth embodiment of the present invention. FIGS. 22A and 22B are explanatory views each illustrating the schematic configuration of the production apparatus, but attitudes (imaging scenes) of robotic arms 101 at the time when an acquired image is transmitted are different from each other. Incidentally, configurations similar to those in the above described first to ninth embodiments are designated by the same reference characters and numerals, and the description will be omitted.

In the above described first to ninth embodiments, the case has been described where the second wireless station has the second antenna portion and the second wireless unit, and the portion and the unit are integrally formed, but the second wireless station may be divided into a transmitting section and a receiving section, and the sections are arranged separately from each other.

A production apparatus 100I in the eighth embodiment is provided with a transmitting section 113 provided with only a transmitting function, which communicates with a wireless station 111I that is a first wireless station of an on-hand camera 106I, and a receiving section 114 provided with only a receiving function, which communicates with the wireless station 111I of the camera 106I. The transmitting section 113 and the receiving section 114 are separately formed, and are arranged at an interval. In the eighth embodiment, the transmitting section 113 is supported by the working surface 104a of the working access platform 104, and the receiving section 114 is supported by the top portion 122 of the frame body 105.

Here, FIG. 22B is a scene in which a trigger signal for imaging is transmitted to the wireless station 111I of the camera 106I, and at this time, wireless communication is transmitted from the transmitting section 113 to the wireless station 111I of the camera 106I. The arrow $D_F$ shows the effective direction of the directional characteristic of the receiving antenna portion in the wireless station 111I. The dashed line $R_F$ shows the angular distribution of receiving sensitivity.

FIG. 22A illustrates the state in which the wireless station 111I of the camera 106I transmits an image signal to the receiving section 114 in response to this trigger signal. The arrow $D_E$ shows the effective direction of the directional characteristic of the transmitting antenna of the wireless station 111I. The dashed line $R_E$ shows the angular distribution of the intensity of a transmitted radio wave.

Figure 23:
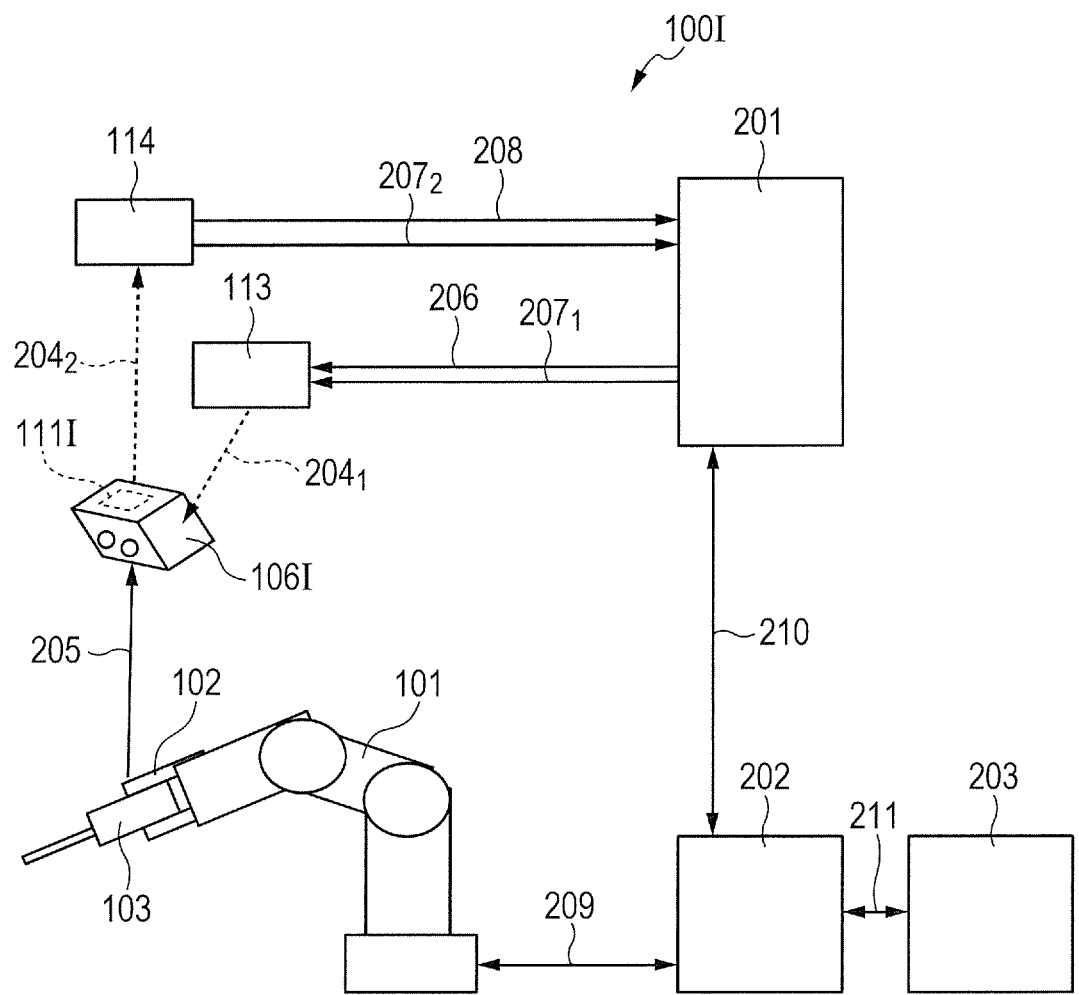
FIG. 23 is a control block diagram of the production apparatus according to the tenth embodiment.

FIG. 23 is a control block diagram of a production apparatus 100I according to the tenth embodiment. The production apparatus 100I is provided with an image processing apparatus (vision controller) 201, a robot control apparatus (robot controller) 202 which functions as a robot controlling unit, and a sequencer 203. The transmitting section 113 and the image processing apparatus 201 are connected by two communication lines 206 and 207$_1$. The receiving section 114 and the image processing apparatus 201 are connected by two communication lines 208 and 207$_2$.

The image processing apparatus 201 transmits a trigger signal for the camera 106I, to the transmitting section 113 through the trigger line 206. In addition, the image processing apparatus 201 transmits a serial control signal which performs the setting of the camera 106I, and the like, to the transmitting section 113 through the transmitting line 207$_1$. The wireless station 111I which is built into the camera 106I and the transmitting section 113 are connected by a wireless path 204$_1$, and the wireless station 111I and the receiving section 114 are connected by the wireless path 204$_1$.

Figure 24A:
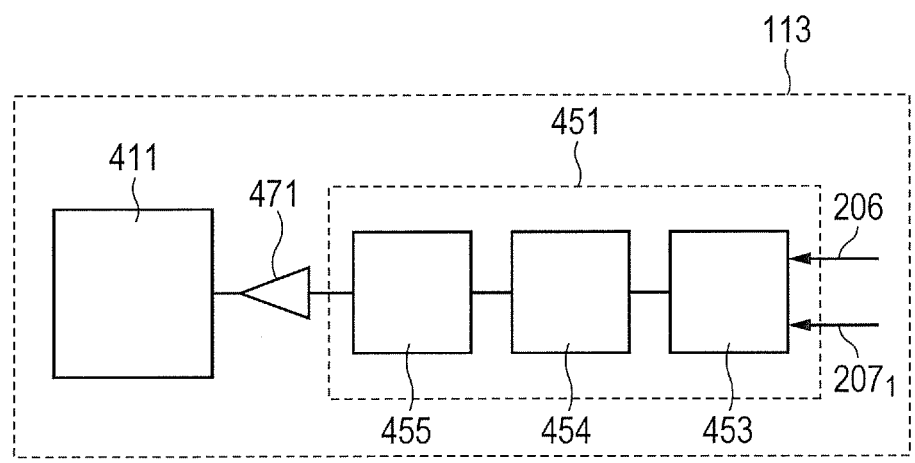
FIGS. 24A and 24B are block diagram illustrating a configuration of a transmitting section and a receiving section of a second wireless station according to the tenth embodiment.
Figure 24B:
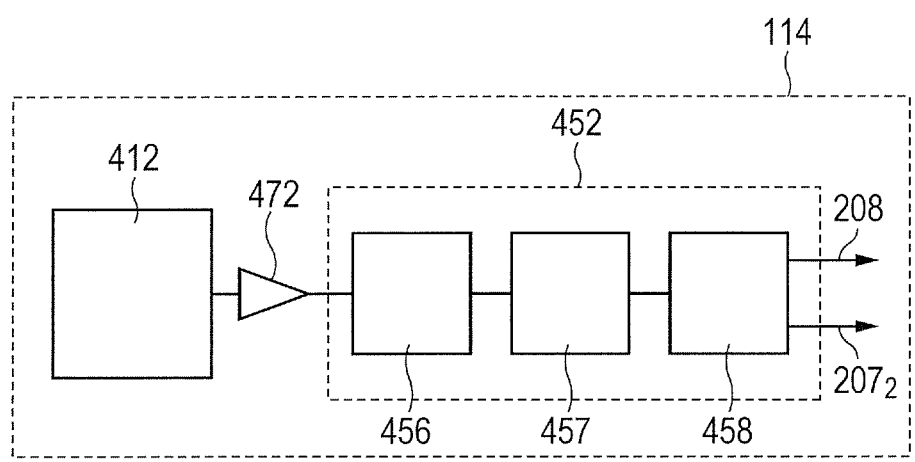

FIGS. 24A and 24B are block diagrams illustrating configurations of the transmitting section 113 and the receiving section 114 in a second wireless station. The transmitting section 113 has a transmitting antenna 411 which functions as a second transmitting antenna portion, and the transmitter 451 which is connected to the transmitting antenna 411 through the driver circuit 471 and functions as the second transmitter, similarly to the above described first embodiment.

The receiving section 114 has a receiving antenna 412 which functions as a second receiving antenna portion, and the receiver 452 which is connected to the receiving antenna 412 through the LNA circuit 472 and functions as the second receiver, similarly to the above described first embodiment. The second wireless unit includes these transmitter 451 and receiver 452, and the second antenna portion includes the transmitting antenna 411 and the receiving antenna 412.

Figure 25A:
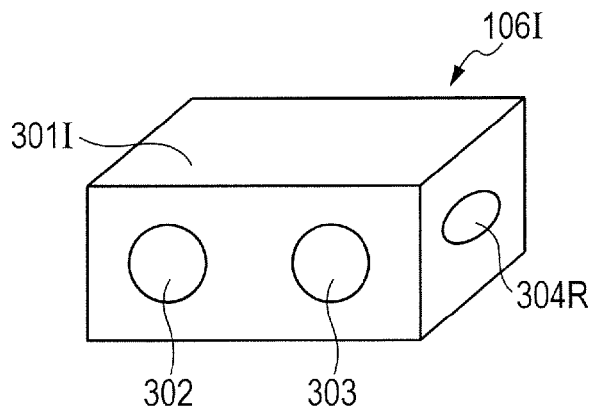
FIGS. 25A, 25B and 25C are explanatory views illustrating an on-hand camera in the tenth embodiment.
Figure 25B:
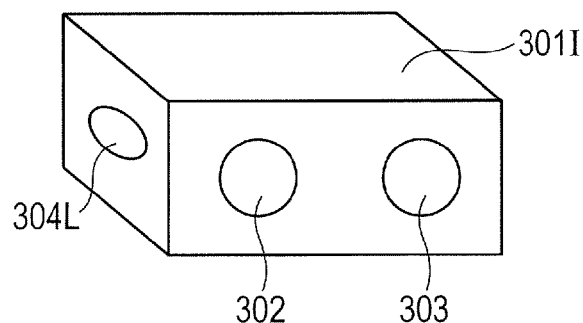
Figure 25C:
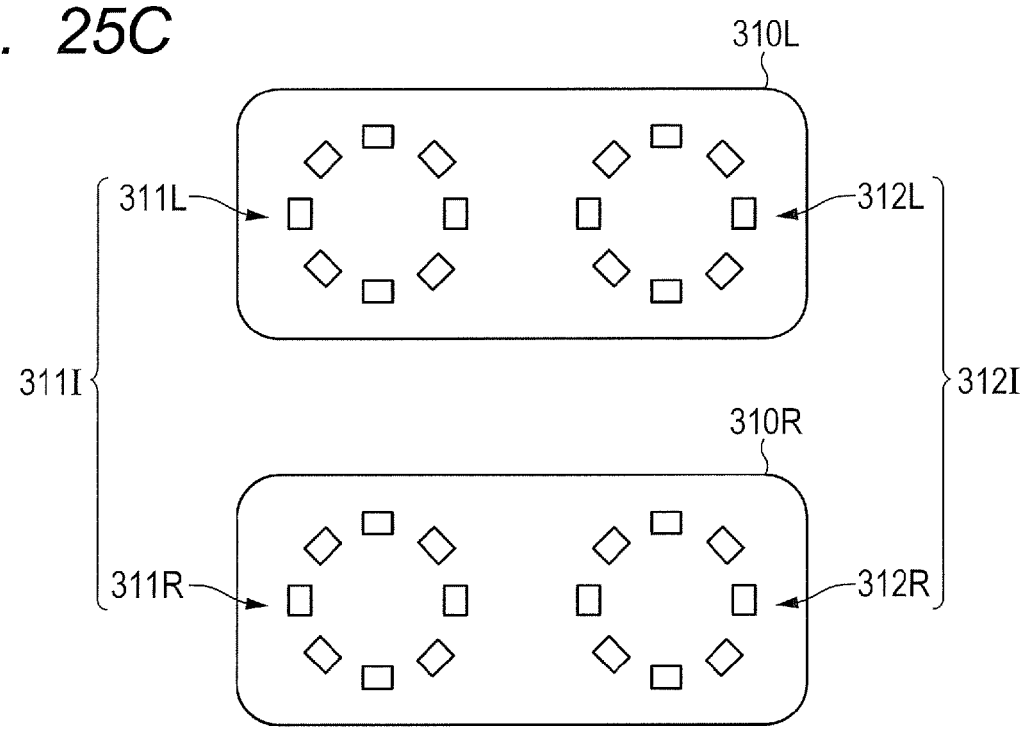

FIGS. 25A, 25B and 25C are explanatory views illustrating the on-hand camera 106I in the tenth embodiment. FIGS. 25A and 25B are contour views illustrating the camera 106I; and FIG. 25C is a plan view of the antenna portion. Incidentally, FIG. 25A is a view of the camera 106I which is viewed from a diagonally front right direction; and FIG. 25B is a view of the camera 106I which is viewed from a diagonally front left direction.

As are illustrated in FIG. 25A and FIG. 25B, the camera 106I has a housing 301I, and the wireless station 111I (FIGS. 22A and 22B) is accommodated in the inner part of the housing 301I. In addition, the camera 106I is a stereo camera, and has lenses 302 and 303 for at least two optical systems. The lenses 302 and 303 are provided on the front face of the housing 301I, and apertures 304L and 304R which expose the antenna units 310L and 310R in FIG. 25C therethrough that are the first antenna portion of the wireless station 111I are formed in faces of the left and right sides of the housing 301I, respectively. An antenna unit (wireless IC chip) 310L is arranged so as to oppose to the aperture 304L, and an antenna unit (wireless IC chip) 310R is arranged so as to oppose to the aperture 304R.

The antenna unit 310L has a transmitting antenna group 311L formed of a plurality of transmitting antennas which have mutually different effective directions of the directional characteristic, and a receiving antenna group 312L formed of a plurality of receiving antennas which have mutually different effective directions of the directional characteristic. The antenna unit 310R has a transmitting antenna group 311R formed of a plurality of transmitting antennas which have mutually different effective directions of the directional characteristic, and a receiving antenna group 312R formed of a plurality of receiving antennas which have mutually different effective directions of the directional characteristic. Incidentally, these antennas are, for instance, patch antennas.

The transmitting antenna portion 311I which is a first transmitting antenna portion includes the transmitting antenna group 311L and the transmitting antenna group 311R. The receiving antenna portion 312I which is a first receiving antenna portion includes the receiving antenna group 312L and the receiving antenna group 312R.

Because the antenna units 310L and 310R are arranged in the sides of the left and right side faces of the housing 301I, respectively, and accordingly the camera 106I can perform transmission/reception to/from various directions of vertical and horizontal directions. Thereby, in one attitude, wireless communication in two different directions can be simultaneously performed.

Figure 26:
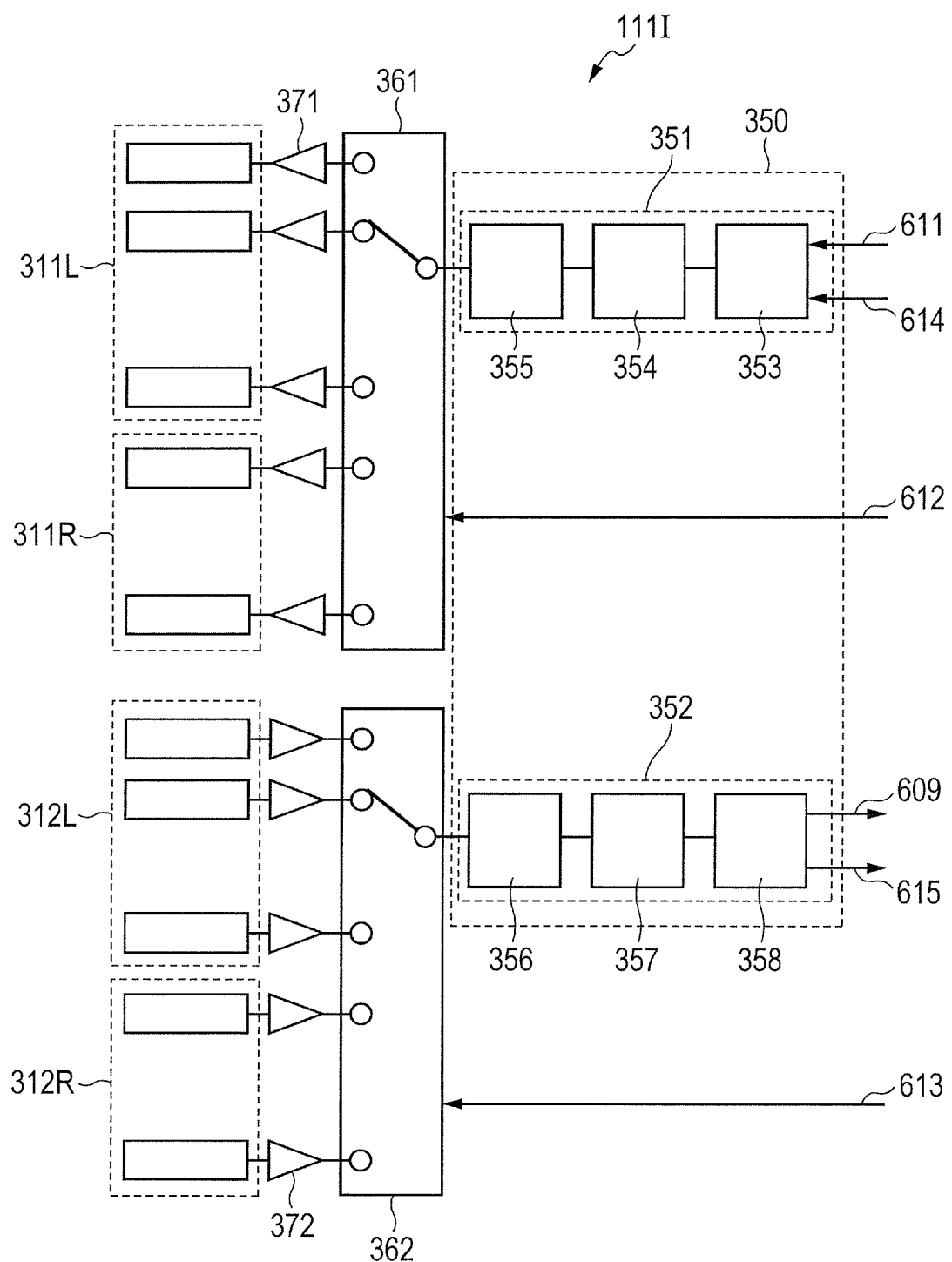
FIG. 26 illustrates a block diagram illustrating a first wireless station in the tenth embodiment.

FIG. 26 illustrates a block diagram illustrating the wireless station 111I. The wireless station 111I has the wireless unit 350, the switcher circuits 361 and 362, the plurality of driver circuits 371, and the plurality of LNA circuits 372, similarly to the above described first embodiment. Each of the transmitting antennas of the transmitting antenna groups 311L and 311R is connected to each of the terminals of the transmitting side switcher circuit 361 through the driver circuit 371. In addition, each of the receiving antennas of the receiving antenna groups 312L and 312R is connected to each of the terminals of the receiving side switcher circuit 362 through the LNA circuit 372.

As has been described above, in the present fifth embodiment, the second wireless station is divided into the transmitting section 113 and the receiving section 114, but the control operation is similar to that in the above described first embodiment.

The transmitting section 113 is placed on the working surface 104a of the working access platform 104, and the receiving section 114 is placed under the top portion 122 of the frame body 105. In the wireless communication, when the wireless station 111I transmits a signal, the image processing apparatus 201 changes over the transmitting side switcher circuit 361 to set the effective direction of the directional characteristic of the transmitting antenna portion 311I at a direction closest to the receiving section 114. In addition, when the wireless station 111I receives a signal, the image processing apparatus 201 changes over the receiving side switcher circuit 362 to set the effective direction of the directional characteristic of the receiving antenna portion 312I at a direction closest to a direction which connects the camera 106I with the transmitting section 113. Due to the above operation, the radio wave transmitted from the wireless unit results in always heading for the upper direction from the lower direction.

As has been described in the above described first embodiment, the accuracy is required when the robotic arm 101 is installed and the component tray 108 and the workpiece mounting table 109 are mounted on the working surface 104a of the working access platform 104, and accordingly the working surface 104a is formed of a metallic member, which easily reflects a radio wave. In contrast to this, it is not so much needed to use the metallic member for the top portion 122, and accordingly the top portion 122 can be configured so as to use a minimal amount of members which reflect a radio wave. Because of this, in the tenth embodiment, the radio wave is always transmitted toward the upper part of the production apparatus, which has a small amount of reflection elements, and accordingly the leakage of the radio wave, which is caused by the reflection of the radio wave into an adjacent production apparatus, can be reduced to the minimal level. As a result, the shielding plate can be omitted.

Incidentally, the present invention is not limited to the embodiments described above, and can be variously modified within a technological idea of the present invention by those who have an ordinary knowledge in the field.

In the above described first embodiment, the case has been described where the antenna portion 310 is provided in the camera 106, but the present invention is not limited to the embodiment. The antenna portion 310 may be attached to the tool 103, the robot hand 102 or the robotic arm 101, for instance. In addition, in the above described first embodiment, the case has been described where the antenna portion 310 which is the first antenna portion and the wireless unit 350 which is the first wireless unit are integrally formed, but the present invention is not limited to the embodiment. The antenna portion 310 and the wireless unit 350 may be separately formed, and be arranged in positions different from each other. The above description is applied also to the above described second to tenth embodiments. In addition, the above description is applied also to the second antenna portion and the second wireless unit.

In addition, in the above described first embodiment, the case has been described where the wireless unit 350 has the transmitter 351 and the receiver 352, but the present invention is not limited to the embodiment. The wireless unit 350 may be formed of only the transmitter 351. In this case, the wireless unit 450 may be formed of only the receiver 452. In addition, the antenna portion 310 may be formed of only the transmitting antenna portion 311, and the antenna portion 410 may be formed of only the receiving antenna 412. The above description is applied also to the above described second to ninth embodiments.

In addition, conversely, in the above described first embodiment, the case is acceptable where the wireless unit 350 is formed of only the receiver 352. In the case, the wireless unit 450 may be formed of only the transmitter 451. Then, the antenna portion 310 may be formed of only the receiving antenna portion 312, and the antenna portion 410 may be formed of only the transmitting antenna 411. The above description is applied also to the above described second to ninth embodiments.

In addition, in the above described first to tenth embodiments, the case has been described where the frame body 105 is a rectangular parallelepiped type, but the frame body 105 may be a frame body having any shape such as a gate type and a cantilever type.

In addition, the above described first to tenth embodiments have been described on the premise that a communication object having a directional characteristic for the second wireless unit which is connected to the second antenna portion is the on-hand camera that is supported by the robotic arm, but the object to be controlled by the wireless communication according to the present invention is not limited to the on-hand camera. For instance, the present invention can be applied also to the control communication with the tool 103 and the robot hand 102. In addition, when the tool 103 and the robot hand 102 are the objects to be controlled by the wireless communication, it is not necessary to limit the timing when the wireless communication is performed to the time when each of the scenes is imaged. The effective direction of the directional characteristic of the first antenna portion may be suitably changed in conjunction with a trajectory of the robotic arm 101. For instance, in the first embodiment, it is also possible that the robot control apparatus 202 sends a changeover signal for an antenna to the first antenna portion which is supported by the robotic arm 101, through the image processing apparatus 201, and controls the first antenna portion so as to enable the wireless communication at all times.

In addition, when the first antenna portion is mounted on the tool 103 or the robot hand 102 and the on-hand camera is not necessary, the image processing apparatus 201 may be omitted. At this time, the wireless station 112 may be directly connected to the robot control apparatus 202 through the interface board which has been provided in the robot control apparatus 202, or may also be communicated with the first wireless unit connected to the first antenna portion, through the interface board.

In addition, in the above described first to tenth embodiments, the case has been described where each of the wireless units has a transmitter and a receiver in order to perform the transmission/reception of a control signal and a trigger signal in addition to an image signal, but the present invention is not limited to the embodiments. For instance, when the first wireless unit has been configured so as to transmit/receive the image signal through the wireless communication and communicate the control signal and the trigger signal with the second wireless unit through the signal line, the first wireless unit may have only the transmitter and the second wireless unit may have only the receiver.

In addition, in the above described tenth embodiment, the case has been described where the transmitting antenna 411 of the transmitting section 113 is supported by the working surface 104a of the working access platform 104, and the receiving antenna 412 of the receiving section 114 is supported by the top portion 122 of the frame body 105, but the present invention is not limited to the embodiment. For instance, the transmitting antenna 411 and the receiving antenna 412 may be supported by the top portion 122, or the transmitting antenna 411 and the receiving antenna 412 may also be supported by the working surface 104a. In addition, in reverse to the above described tenth embodiment, the transmitting antenna 411 may be supported by the top portion 122 and the receiving antenna 412 may be supported by the working surface 104a.

In addition, in the above described first to tenth embodiments, the case has been described where the first antenna portion is provided with the transmitting antenna portion and the receiving antenna portion separately, but the present invention is not limited to the embodiments. If the transmitter and the receiver of the first wireless unit are configured so as to be connected to the first antenna portion in a form of being changed over, the first antenna portion may be an antenna portion which serves for both of the transmission and the reception. The above description is applied also to the second antenna portion.

According to the present invention, such an occurrence can be suppressed that a radio signal which is used in the production apparatus interferes with a radio signal which is used in an adjacent production apparatus. In addition, the effective direction of the directional characteristic of the first antenna portion is changed in conjunction with the operation of the robotic arm, and accordingly the production apparatus does not need to search for the direction in which electromagnetic waves are intense. Because of this, the loss of the time required for the search is eliminated, and a property of real time wireless communication between a first wireless unit and a second wireless unit is ensured, and the tact time of production is shortened.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions This application claims the benefit of Japanese Patent Application No. 2013-140328, filed Jul. 4, 2013, which is hereby incorporated by reference herein in its entirety.

What is claimed is:

1. A production apparatus comprising:
a robotic arm;
a first antenna unit having a directional characteristic and being supported by the robotic arm;
a first wireless unit connected to the first antenna unit;
a working access platform having a working portion placed lower than a movable space of the first antenna unit;
a frame body having a top portion placed higher than the movable space of the first antenna unit;
a second antenna unit having a directional characteristic effective in a direction to the first antenna unit, and being supported by the working portion or the top portion; and
a second wireless unit connected to the second antenna unit, to perform a wireless communication with the first wireless unit through the first and second antenna units; and
a first changing unit configured to change an effective direction of the directional characteristic of the first antenna unit in conjunction with an operation of the robotic arm, such that the second antenna unit is kept within an effective characteristic area of the first antenna unit.

2. The production apparatus according to claim 1, further comprising
a robot controlling unit configured to control an attitude of the robotic arm,
the first changing unit changes the effective direction of the directional characteristic of the first antenna unit, in conjunction with an attitude information of the robotic arm acquired from the robot controlling unit.

3. The production apparatus according to claim 2, wherein
the first antenna unit has a plurality of antennas of which effective directions of the directional characteristic are different from each other, and
the first changing unit has a changeover unit configured to change over, among the plurality of antennas, the antenna to be connected to the first wireless unit, in conjunction with the attitude information.

4. The production apparatus according to claim 2, wherein
the first antenna unit has a plurality of antenna elements, and is a phased-array antenna changing effective directions of the directional characteristic in conjunction with a phase of an electromagnetic wave of the antenna elements, and
the first changing unit has a phase changer configured to change the phase of the electromagnetic wave of the antenna elements, in conjunction with the attitude information.

5. The production apparatus according to claim 2, wherein
the first changing unit has a drive mechanism changing the attitude of the first antenna unit, in conjunction with the attitude information.

6. The production apparatus according to claim 2, wherein the first changing unit has
a reflective plate placed in a path of the effective directions of the directional characteristic of the first antenna unit, and
a drive mechanism changing the attitude of the first antenna unit, in conjunction with the attitude information.

7. The production apparatus according to claim 1, further comprising
an attitude detecting unit configured to detect an attitude of the robotic arm,
the first changing unit changes the effective direction of the directional characteristic of the first antenna unit, in conjunction with an attitude information of the robotic arm acquired from the attitude detecting unit.

8. The production apparatus according to claim 1, wherein
the first changing unit has an attitude keeping mechanism keeping the first antenna unit at a predetermined attitude, independent of the attitude of the robot arm.

9. The production apparatus according to claim 1, further comprising
a second changing unit configured to change an effective direction of the directional characteristic of the second antenna unit in conjunction with the operation of the robotic arm, such that the first antenna unit is kept within an effective characteristic area of the second antenna unit.

10. The production apparatus according to claim 1, further comprising
a shielding plate arranged at the frame body to shield a radio signal so as not to emit the radio signal from an inside of the frame body into an outside of the frame body.

11. The production apparatus according to claim 1, wherein
the first wireless unit is a transmitter transmitting a radio signal, and
the second wireless unit is a receiver receiving a radio signal.

12. The production apparatus according to claim 1, wherein
the first wireless unit has a first transmitter transmitting the radio signal and a first receiver receiving the radio signal, and
the second wireless unit has a second transmitter transmitting the radio signal and a second receiver receiving the radio signal.

13. The production apparatus according to claim 12, wherein
the second antenna unit has a transmitting antenna portion connected to the second transmitter, and has a receiving antenna portion connected to the second receiver, and
the transmitting antenna portion and the receiving antenna portion are supported respectively by the working portion or the top portion.

14. The production apparatus according to claim 13, wherein
the transmitting antenna portion is supported by the working portion, and the receiving antenna portion is supported by the top portion.

15. The production apparatus according to claim 1, further comprising
an image sensor, wherein
the first wireless unit transmits an image signal based on an image acquired by the image sensor.

16. The production apparatus according to claim 1, wherein
the first wireless unit is a receiver receiving a radio signal, and
the second wireless unit is a transmitter transmitting a radio signal.

17. The production apparatus according to claim 1, wherein
a plurality of the second antenna units are provided, and are arranged at an interval.

18. The production apparatus according to claim 1, further comprising
a robot hand attached to an end of the robot arm, and
a tool grasped by the robot hand, wherein
the first antenna unit is fixed to the tool.

* * * * *